(12) United States Patent
Holm

(10) Patent No.: US 6,563,945 B2
(45) Date of Patent: May 13, 2003

(54) PICTORIAL DIGITAL IMAGE PROCESSING INCORPORATING IMAGE AND OUTPUT DEVICE MODIFICATIONS

(76) Inventor: Jack M. Holm, 7352 E. River Rd., Rush, NY (US) 14543-9769

(*) Notice: Subject to any disclaimer, the term of this patent is extended or adjusted under 35 U.S.C. 154(b) by 0 days.

(21) Appl. No.: 09/771,735

(22) Filed: Jan. 29, 2001

(65) Prior Publication Data

US 2001/0009590 A1 Jul. 26, 2001

Related U.S. Application Data

(62) Division of application No. 08/822,053, filed on Mar. 24, 1997.

(51) Int. Cl.$^7$ .................................................. G06K 9/00
(52) U.S. Cl. ........................................ 382/162; 348/582
(58) Field of Search ................................. 382/167, 169, 382/298, 274, 275; 358/518, 523, 451, 3.01, 3.02–3.2, 3.21; 345/596, 690, 697, 660–671; 348/561, 581, 582, 704

(56) References Cited

U.S. PATENT DOCUMENTS

| | | | |
|---|---|---|---|
| 4,384,336 A | 5/1983 | Frankle et al. | 382/49 |
| 4,636,845 A | 1/1987 | Alkofer | 358/80 |
| 4,642,683 A | 2/1987 | Alkofer | 358/80 |
| 4,654,722 A | 3/1987 | Alkofer | 358/284 |
| 4,731,671 A | 3/1988 | Alkofer | 358/284 |

(List continued on next page.)

OTHER PUBLICATIONS

ANSI/ISO 7589–1984, "Photography–Illuminants for Sensitivity—Specifications for Daylight and Incandescent Tungsten", Jun. 17, 1985, 16 pages.

"Exposure–Speed Relations and Tone Reproduction", J. Holm, Proceedings IS&T's 47$^{th}$ Annual Conference/ICPS, 1994, p. 641–648.

ISO 5–3, "Photography–density Measurements—Part 3: Spectral Conditions", Nov. 15, 1995, 24 pages.

ITIO/97–17, "Photography—Digital Still Picture Cameras—Methods for the Transmutation of Sensor Data Into Standard Colour Spaces", Mar. 3, 1997, 14 pages.

(List continued on next page.)

*Primary Examiner*—Samir Ahmed
(74) *Attorney, Agent, or Firm*—Eugene Stephens & Associates

(57) ABSTRACT

Image-dependent tone and color reproduction processing of digital images is accomplished by creating a spatially blurred and sub-sampled version of the original image, and applying knowledge of the capture device physical characteristics to obtain statistics related to the scene or original captured. The statistics are used for image-dependent linearization of the captured image data based on an OECF model, and in conjunction with information about the output medium, to calculate image-specific preferred tone reproduction curves based on a preferred reproduction model. These curves may be applied to the red, green, and blue channels of RGB-type images to produce preferred tone and color reproduction, or to the luminance channel of luminance-chrominance type images to produce preferred tone reproduction. Alternately, the linearized image data may be reproduced directly. Also, if the original is assumed to already possess preferred reproduction, the preferred reproduction model may be used to undo the preferred reproduction on the original. The image data can then be processed for reproduction on output media with different density ranges and color gamuts. All the processing described can be accomplished automatically, but the access to accurate scene information afforded by the image-dependent linearization, and to the perceptually intuitive parameters controlling the calculation of the preferred reproduction curves, also allows for simple, intuitive manual adjustment.

27 Claims, 10 Drawing Sheets

U.S. PATENT DOCUMENTS

| | | | |
|---|---|---|---|
| 5,047,861 A | 9/1991 | Houchin et al. | 358/213.15 |
| 5,105,469 A | 4/1992 | MacDonald et al. | 382/17 |
| 5,189,511 A | 2/1993 | Parulski et al. | 358/80 |
| 5,267,030 A | 11/1993 | Giorgianni et al. | 358/527 |
| 5,317,425 A | 5/1994 | Spence et al. | 358/504 |
| 5,420,979 A | 5/1995 | Madden et al. | 395/162 |
| 5,447,811 A | 9/1995 | Buhr et al. | 430/20 |
| 5,452,111 A | 9/1995 | Giorgianni et al. | 358/504 |
| 5,521,723 A | 5/1996 | Madden et al. | 358/501 |
| 5,528,339 A | 6/1996 | Buhr et al. | 355/32 |
| 5,724,456 A | 3/1998 | Boyack et al. | 382/274 |

OTHER PUBLICATIONS

Factors to Consider In Pictorial Digital Image Processing:, J. Holm, Proceedings, 49$^{th}$ Annual Conference of the Society For Imaging Science & Technology, 1196, p. 298–304.

Photographic Tone and Colour Reproduction Goals, J. Holm, Proceedings, CIE Expert Symposium '96 on Colour Standards For Image Technology, 1996, p. 51–56.

ISO/CD 12234–2, "Photography—Electronic Still Picture Cameras—Removable Memory, Part 2: Image Data Format—TIFF/ED", Jun. 3, 1996, 56 pages.

"A Strategy for Pictorial Digital Image Processing (PDIP)", J. Holm, Proceedings, IS&T/SID Fourth Color Imaging Conference: Color Science, Systems and Applications, 1996, p. 194–201.

"Proposal for a Standard Default Color Space for the Internet—SRGB", M. Anderson, R. Motta, S, Chandrasekar, and M. Stokes, Proceedings, IS&T/SID Fourth Color Imaging Conference: Color Science, Systems and Applications, 1996, p. 238–246.

ISO/DIS 12234–1, "Photography—Electronic still picture cameras—Removable Memory, Part 1: Basic removable memory reference model", Oct. 1, 1996, 20 pages.

ISO/TC42, "Photography—Electronic scanners for photographic images—Spatial Frequency Response (SFR) Measurements: Part 1: Reflective Media", Apr. 14, 1997, 7 pages.

IT8.7/4 199X, "Graphic Technology C, Three–Component Color Data Definitions", Oct. 21, 1996, 20 pages.

ICC Profile Format Specification, Version 3.3—International Color Consortium, Nov. 11, 1996, 120 pages.

ISO/TC42, ISO 14524, "Photography–Electronic Still Picture Cameras—Methods for measuring opto–electronic conversion functions (OECF's)", Mar. 29, 1997, 22 pages.

Recommendation ITU–R BT, 709.3, "Parameter Values for the HDTV Standards for Production and International Programme Exchange", 1990–1994–1995–1998 (finalized 1998).

PICTORIAL DIGITAL IMAGE PROCESSING INCORPORATING IMAGE AND OUTPUT DEVICE MODIFICATIONS

RELATED APPLICATION

This application is a Division of copending allowed parent application Ser. No. 08/822,053, filed Mar. 24, 1997, by Jack M. Holm, entitled STRATEGY FOR PICTORIAL DIGITAL IMAGE PROCESSING. The parent application is hereby incorporated by reference.

TECHNICAL FIELD

This invention relates generally to the processing of digital images to produce desired tone and color reproduction characteristics. Specifically, this invention makes use of capture and output device information, in conjunction with opto-electronic conversion function (OECF) and preferred reproduction models, to determine image-specific processing based on statistics derived from the image data. The processing determined may be applied automatically or with user input.

BACKGROUND OF THE INVENTION

Digital cameras and scanners are used to capture image data from a large variety of scenes and originals. A number of automatic approaches are employed to process this data for reproduction; but when reproduction quality is critical, most images are processed manually by experts. Expertly processed images are also overwhelmingly preferred, even by inexperienced viewers, when comparisons are made.

Manual processing is time consuming and must be done by individuals with significant expertise, partly because the controls found in currently available software packages make it difficult to achieve desired tone and color reproduction. Simple controls tend to vary the reproduction in ways that miss the optimum, and complex controls offer too many degrees of freedom. If a way could be found to produce results similar to those produced by experts, either automatically or with simple and intuitive manual adjustments, digital photography would become a much more attractive alternative to conventional photography.

The practice of conventional photography suggests that improvements in this direction are possible. Currently, conventional photographs tend to be superior to automatically processed digital photographs in tone and color reproduction, with photographs processed at professional laboratories being far superior. Yet the flexibility of digital systems is greater than that of conventional systems. Digital photographs have the potential to be better than conventional photographs, and expertly processed digital photographs are currently at least as good. Digital processing approaches that mimic the relatively fixed behavior of conventional photographic systems should be straightforward to develop. Insight into digital processing approaches can also be obtained by examining what experts do manually. If this is done, it is found that most of the decisions made are based on evaluations of the image with respect to the scene or original and with the desired reproduction goal in mind. It should be possible to develop software algorithms that can perform these evaluations and process images accordingly.

Three major factors have hindered progress in this area. The first is that expert manual processing is almost always image-dependent and is based on understood tone and color reproduction objectives; but the development of most digital tone and color reproduction processing has focused on schemes which do not consider the image data, or consider it without regard for established pictorial considerations. The second is that the exact meaning of the image data, with respect to the scene or original, must be known. To date, the approaches used have ignored many non-linearities, such as those introduced by optical flare and other image capture effects, and have concentrated on techniques based almost exclusively on colorimetry. Colorimetry is strictly applicable only when the capture spectral sensitivities are color matching functions, or when the colorants used in the original are known and limited to a number which is not greater than the number of spectral capture channels. With digital cameras in particular, this is frequently not the case. Other difficulties in determining scene physical characteristics have resulted from a lack of standard, accurate measurement approaches. When basic flaws are present in a measurement approach, such as the omission of flare considerations and the fact that the spectral characteristics of the detector preclude calorimetric information from being obtained, attempts to calculate scene values inevitably produce erroneous results. These errors reduce accuracy expectations and mask other error sources, seriously degrading the correlation between captured data and scene characteristics.

The final factors which have hindered progress are the slow recognition of the need for preferred reproduction as an alternative goal to facsimile reproduction, that preferred reproduction is dependent on the scene or original, and that the output and viewing condition characteristics. As mentioned previously, most digital tone and color reproduction processing development has focused on schemes which do not consider the image data. Also, color management approaches based on colorimetry attempt to produce reproductions with colorimetric values similar to those of the original. While calorimetric measures can consider some viewing condition effects, others are not considered and the effects of the scene characteristics and media type on preferred reproduction are ignored.

It is clear that the factors limiting tone and color reproduction quality in digital images stem from an incomplete and sometimes inappropriate global strategy. The inventor has attempted to deal with these problems in two ways: through participation and leadership in the development of national and international standards and with the inventions presented here. The following list specifies gaps in the strategy and the attempts to fill them in:

1. Inaccurate and Non-Standard Device Measurements.

Image capture and output devices are measured in a variety of ways, with various measurement and device effects being ignored. Specifically:

a) Flare and other non-linearities in both capture devices and measuring instruments are frequently not considered, or are measured for a particular condition, and the resulting values are erroneously assumed to be applicable to other conditions.

b) Test targets captured typically have considerably lower luminance ratios than pictorial scenes, so the extremes of the capture device range are truncated or left uncharacterized.

c) Attempts are made to correlate image data to calorimetric quantities in scenes by capturing data of test targets with devices whose channel spectral sensitivities are not color matching functions. Correlations established in this fashion will depend on the test target used and may not apply to image data from other subjects.

d) Measurement precision is frequently specified in linear space, resulting in perceptually large errors for darker image areas. These areas are also most affected by flare, making dark area measurements particularly inaccurate.

e) Measurement geometries and lighting may be inconsistent or inappropriate to the device use conditions.

All of these effects compound to produce device characterization measurements which can be quite inaccurate. A common perception of these inaccuracies is that it is practically impossible to obtain stable measurements and, therefore, measurement accuracy need not be too high. Frequently, assumptions are made about the nature of image data, because it is felt that the assumption will be as close to the real value as a measurement.

However, in conventional photography, standardized density measurement techniques have evolved over decades. These techniques routinely produce repeatable measurements with several orders of magnitude higher accuracy than those obtained for digital systems, which is one of the reasons the less flexible conventional systems are able to outperform current automatic digital systems. Unfortunately, the reason these techniques are so accurate is because they have been refined specifically for conventional photographic materials. A great deal of work will be required to develop similar techniques for the devices and material used in digital systems.

Work has just begun in this area, but significant progress is already being made. A new standard to be issued by the International Organization for Standardization (ISO), "ISO 14524, Photography—Electronic still picture cameras—Methods for measuring opto-electronic conversion functions (OECFs)," is almost complete, and work has begun to develop two new standards:
"Digital still picture cameras—Methods for the transformation of sensor data into standard colour spaces" and "Photography—Film and print scanners—Methods for measuring the OECF, SFR, and NPS characteristics." While these efforts are collaborative and open, the inventor is the project leader for the former two efforts, and participates in the latter.

2. Difficulties in Communicating Device Information Due to a Lack of Standard Data Types, Terms, and Data Formats.

Even if accurate measurements are available, a complete processing strategy requires that the measurements characterize the device in question by completely filling with values an enumerated list of expected measurements. These values must also be provided in the image file in a standard format to be readily usable by a variety of processing software. "ISO 12234/1, Photography—Electronic still picture cameras—Removable memory, Part 1: Basic removable memory reference model" and "ISO 12234/2, Photography—Electronic still picture cameras—Removable memory, Part 2: Image Data Format—TIFF/EP" define the characterization data required and where and how it is to be included in image files. The inventor was a key participant in the development of this standard, particularly the enumeration of the characterization data. It should be noted that because of a lack of consensus concerning the need for some of the data among the members of the ISO working group, some of the data categories are defined as "optional" at present, but the necessary categories are described.

3. How to Deal with Image-Dependent Capture Non-Linearities.

The measurement methods described in the standards mentioned above tell how to measure digital photography system characteristics using various test targets, but they do not deal with methods for estimating image-dependent capture non-linearities. A solution to this problem is described in this patent application.

4. Lack of Specification of Standard, Optimal Methods for Transforming Image Data from the Capture Device Spectral Space to Standard Color Spaces.

A number of methodologies have evolved for transforming capture device data into intermediate or standard color spaces. Many of these methods have merit in particular circumstances, but in many cases are applied inappropriately. The lack of accurate characterization data compounds the problem in that it is difficult to tell if the cause of low quality transformed data is an inappropriate transformation method, inaccurate characterization data, or both.

Another difficulty has been that, until recently, the only standard color spaces used for digital photography were those defined by the CIE (Commission Internationale de L' Éclairage or International Commission on Illumination) based on the human visual system (HVS). For various reasons, it is generally impractical to design digital photography systems that mimic the HVS. Most digital photography systems analyze red, green, and blue (RGB) light; and most output devices modulate these spectral bands. In conventional photography, specific RGB bands are well defined by the spectral characteristics of the sensitizing dyes and colorant dyes used and by standards such as "ISO 7589, Photography—Illuminants for Sensitometry—Specifications for Daylight and Incandescent Tungsten" (which defines typical film spectral sensitivities) and "ISO 5/3, Photography—Density measurements—Spectral conditions." These standards were developed many years ago, but the inventor actively participates in their maintenance and revision.

In digital photography, a wide variety of spectral sensitivities and colorants are used by different systems. Many of these systems are based on RGB analysis and synthesis, but the data produced in capturing a particular scene can vary substantially between capture devices. Also, if the same RGB image data is provided to different output devices, significantly different results will be obtained; and the differences will not be, for the most part, the results of optimization of the image data to the media characteristics.

Over the past five years, companies involved with digital imaging have recognized this problem and invested significant resources in solving it. Some progress has been made, particularly within the International Color Consortium (ICC), an association comprising most of the major computer and imaging manufacturers. However, the efforts of the ICC have been directed at producing consistent output from image data. The metrics employed are based on colorimetry and generally aim to produce output on different devices that is perceptually identical when viewed under a standard viewing condition. This aim is commonly referred to as "device-independent color." Device-independent color is an appropriate goal in some cases, but frequently falls short. Different media have vastly different density range and color gamut capabilities, and the only way to make sure that all colors are rendered identically on all media is to limit the colors used to those of the lowest dynamic range (density range and color gamut) medium. This is certainly not desirable, and consequently a number of ICC member (and other) companies are now creating "ICC profiles" that produce colors from the same image data which vary between devices. (ICC profiles are device-specific transformations in a standard form that ostensibly attempt to transform image data to produce device-independent results.)

The basis for the color science on which device-independent color is based is the behavior of the HVS. Much of this behavior is reasonably well understood, but some is not, particularly the effects of some types of changes in viewing conditions, and localized adaptation. Also, the effects of media dynamic range on preferred reproduction have little to do with the HVS. Appearance models may be able to predict how something will look under certain conditions, but they give no information about observer preferences for tone and color reproduction in a particular photograph.

ICC profiles are currently being produced that attempt to transform captured image data to produce colorimetric values (input profiles), and that take image data and the associated input profile and attempt to transform the colorimetric values to data suitable for output on a particular device (output profiles). These profiles are generally considered to be device-specific, in that a particular input profile is associated with a particular capture device and a particular output profile is associated with a particular output device. This type of association makes sense in view of the philosophy of the approach. If a scene or original is characterized by particular colorimetric values, the goal of the input profile is to obtain these values from the captured data. Likewise, the goal of the output profile is to reproduce the calorimetric values on the output medium. Since the goal is facsimile calorimetric reproduction, the profile should be independent of the scene content or media characteristics.

If the capture device spectral sensitivities and/or colorants used in the original make it possible to determine colorimetric values from captured data, it is theoretically possible for ICC-type input profiles to specify the appropriate transformations. Also, if the characteristics of the capture device do not vary with the scene or original captured and the device spectral sensitivities are color matching functions, a single profile will characterize the device for all scenes or originals. If knowledge of the colorants is required to allow calorimetric data to be obtained, a single profile is adequate for each set of colorants. Unfortunately, flare is present in all capture devices that form an image of the scene or original with a lens (as opposed to contact type input devices, like drum scanners). The amount of flare captured will vary depending on the characteristics of the scene or original. Occasionally, other image-dependent non-linearities are also significant. For ICC profiles to specify accurate transformations for devices where flare is significant, not only must the calorimetric spectral conditions be met, but the image-dependent variability must be modeled and considered. The resulting input profiles are dependent on the distribution of radiances in the scene or original, as well as the capture device used and the colorants (if applicable).

In summary, the primary difficulties with using ICC profiles to specify transformations are:

a) ICC input profiles only allow transformations to CIE color spaces, yet transformations to this type of color space are valid only if the capture device sensitivities are color matching functions, or colorants found in the scene or original are known, and are spanned by spectral basis functions not greater in number than the number of device spectral capture channels. These conditions are almost never met when digital cameras are used to capture natural scenes.

b) The appropriate ICC input profile for a particular device and/or set of colorants to be captured is generally assumed to be invariant with the content of the scene or original. This assumption is not valid with the many capture devices that have significant amounts of flare, such as digital cameras and area array scanners.

c) The measurement techniques used to determine ICC profiles are variable, and the profiles constructed are usually not optimal. Frequently, profiles are not linearized correctly, neutrals are not preserved, and incorrect assumptions are made about the colorants in the scene or original. These inaccuracies are masked by and compounded with the inaccuracies mentioned in a and b.

d) While it is recognized that different output media must produce different calorimetric renderings of the same image data for the results to be acceptable, there is no standard methodology for determining how to render images based on the dynamic range of the scene or original, as compared to the output medium.

The ICC efforts have resulted in a significant improvement over doing nothing to manage colors, but in their current manifestation are not viewed as a substitute for manual processing. Fortunately, the ICC approach is continuing to evolve, and other organizations are also contributing. In particular, there is a proposal in the ICC to allow another standard color space based on a standard monitor. This color space is an RGB space, making it more appropriate for use with many capture devices, particularly RGB-type digital cameras and film scanners. This proposal is also being developed into a standard: "CGATS/ANSI IT8.7/4, Graphic technology—Three Component Color Data Definitions." The inventor is involved in the development of this standard. Also, the proposed new ISO Work item mentioned previously, for which the inventor is the project leader, "Digital still picture cameras—Methods for the transformation of sensor data into standard colour spaces," is specifically aimed at specifying methods for determining optimal transformations. As these efforts are completed and if the methods for dealing with image-dependent non-linearities of my invention are used, it should become possible to specify capture device transformations that are determined in standard ways and based on accurate measurements.

5. How to Determine Preferred Reproduction Based on the Characteristics of the Scene or Original and the Intended Output Medium.

The first part of the digital image processing pipeline transforms capture device data into a standard color space. Once the data is in such a color space, it is necessary to determine an output transformation that will produce preferred reproduction on the output medium of choice. A method for accomplishing this is contemplated by my invention.

6. How to Take Image Data Processed for Preferred Reproduction on One Output Medium and Transform it for Preferred Reproduction on Another Output Medium.

Frequently, it is necessary to take image data which has already been processed for preferred reproduction on one output device and process it for preferred reproduction on another output device. A method for accomplishing this also contemplated by my invention.

7. How to Implement User Adjustments that Produce Preferred Reproduction with Maximum Simplicity and Intuitiveness.

As stated previously, current manual processing software tends to be overly complicated and offers too many degrees of freedom or is incapable of producing optimal results. The implementation of the preferred reproduction model described in this patent application allows for user specification of key parameters. These parameters are limited in number; and changing them produces transformations which always produce another preferred rendering, limiting the possible outputs to those that are likely to be preferred.

SUMMARY OF THE INVENTION

Embodiments of my invention, in conjunction with the above-mentioned international standards under development, solve the above-identified problems by providing a complete strategy for the processing of digital image data to produce desired tone and color reproduction characteristics. The details of this strategy are as follows:

1. A scaled version of the image is constructed by spatially blurring and sub-sampling each channel of the image data. The scaled version is preferably a reduced version, but can be of any scale with respect to the original image. The blurring and sub-sampling are accomplished using one or more filters that first blur the image data using a blur filter with a radius that is primarily related to the number of pixels, rows of pixels, or columns of pixels in the image channel, but can also be affected by other factors, such as the intended output size or pixel pitch, the intended output medium, the numerical range of the image data, etc. Any common blur filter can be used, such as a boxcar averaging or median, a Gaussian blur, etc. The blurred image is then decimated to produce the scaled image, which is stored for future use.

2. The capture device focal plane OECFs are determined for each channel according to ISO 14524 for digital cameras or the standard which results from the new work item under development for scanners. The inverses of these OECFs are then determined, either in functional form or as look-up-tables (LUTs). This information may also be provided by the device manufacturer or included in the image file header with some file formats.

3. The scaled image data is transformed into focal plane data using the inverse focal plane OECFs. Statistical values are then determined for each channel from the transformed data. Typical statistical values are the minimum and maximum focal plane exposures, the mean focal plane exposure, and the geometric mean focal plane exposure. Other statistical values may be determined in some cases.

4. The capture device design and OECFs are evaluated to determine if the capture device has significant image-dependent non-linearities or flare. If image-dependent effects are found, they are modeled. The model to be produced should predict the amounts of non-linearities and flare based on statistical values determined from the scaled image data. Models can be constructed by capturing a variety of scenes or originals (such as ISO camera OECF charts with a variety of luminance ranges and background luminances), determining the flare and non-linearities encountered when capturing these charts, and then correlating the measured values with the scaled image statistics. Flare models can also be constructed by compounding extended point-spread-functions. A flare model may be provided by the device manufacturer, but there is no mechanism at present for including this information in the file format.

5. The estimated camera or scanner OECFs for the image represented by the scaled image are determined for each channel using the OECF measurement standards mentioned, in conjunction with the flare and non-linearity model. The inverses of these OECFs are then determined, either in functional form or as LUTs. These inverse OECFs, which will be referred to as the input linearization information or input linearization tables, are stored for future use.

6. The capture device spectral sensitivities are evaluated and an appropriate transformation to an intermediate spectral or color space is determined. This intermediate color space is preferably a color space appropriate for application of the preferred reproduction model, such as a standard color space. If the intermediate color space is a standard color space, the transformation can be determined according to one of the methods in the proposed new ISO standard. In this case, the input linearization table is used to linearize the captured data, as required by the standard. The transformation may also be provided by the device manufacturer or included in the image file header with some file formats.

7. The scaled image is linearized using the input linearization table and transformed to the intermediate color space using the transformation determined. A luminance channel image is then determined using the equation appropriate for the intermediate color space. Statistical values are then determined from the luminance channel data. Typical statistical values are the minimum and maximum (extrema) scene luminances, the mean luminance, and the geometric mean luminance. Other statistical values may be determined in some cases. The scaled image data is generally not needed after these statistical values are determined.

8. The output device is determined, either by assuming it to be a standard monitor, by asking the user, or by the software (if intended for a specific device). The visual density ranges of all selectable output devices should be known. The viewing conditions under which the output will be viewed may also be specified.

9. The statistical values determined from the luminance channel of the scaled image, the density range of the output device, and the viewing illumination level (if known) are input to the preferred reproduction model. This model calculates an image and output specific preferred tone reproduction curve. This tone reproduction curve is typically applied to RGB channels, to produce preferred tone and color reproduction.

10. The output device electro-optical conversion function (EOCF) characteristics are determined by measuring the output of the device for all possible input digital levels or, in the case of the standard monitor, by using the standard monitor EOCF. An output transformation is then determined by combining the preferred tone reproduction curve with the output device EOCF. This transformation may be expressed in functional form or as a LUT and will be referred to as the output table.

11. The image data for the entire image is linearized using the input linearization tables. It is then preferably transformed into the intermediate color space. This color space can be a standard RGB space, although monochrome image data should be transformed into a luminance-type space, and this processing also may be used to produce desired tone reproduction characteristics with luminance-chrominance type color space data. The output tables are then applied to the linear intermediate color space data to produce digital code values appropriate for a standard monitor or the specified output device. If necessary, standard RGB values or other color space values corresponding to preferred reproduction may be converted to another color space for use by the output device. In this case, the goal of the processing employed by the output device is to produce a facsimile reproduction of the preferred reproduction as expressed in the standard RGB or other original color space. The preferred reproduction should have been determined with consideration of the luminance range capabilities of the output medium.

DESCRIPTION OF THE INVENTION

Figure 1:
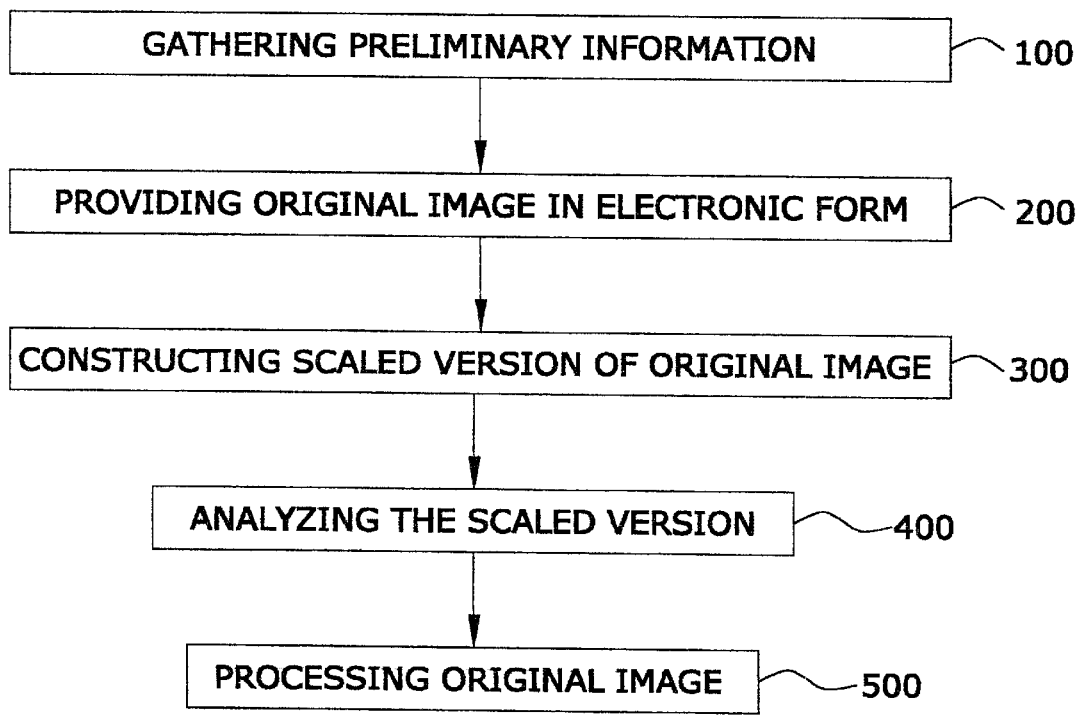
FIG. 1 is a schematic flow chart of the overall method of the invention.

The processing strategy described herein and shown schematically in the accompanying Figures and Tables seeks to accomplish four goals simultaneously:

Process image data to produce the best possible result in terms of what is desired by the user.

Minimize complexity whenever possible in order to reduce computational requirements and emphasize the basic function of the processing algorithms employed.

Automate the processing to the greatest extent that is consistent with hardware capabilities and user quality expectations.

Improve the efficiency of user adjustments by focusing capabilities on the more likely outcomes and making the adjustment process as intuitive as possible.

The above goals force processing strategies in specific directions. In particular, it is desirable to consider the physics of imaging systems. Many operations are best performed with the image data in a particular physical representation. Also, physical measurements of the behavior of components in each system can be extremely useful in determining processing parameters. Since little of this information is obtained by the user, it is desirable to automate the transfer of this information, either as part of the image file or between devices and the processing software. Several newer image file formats accommodate this transfer.

Another consideration in the development of the processing strategy is device-independent performance optimization. Digital image data comes from a variety of sources and may be used for a variety of purposes. For any strategy to be truly useful, it must be able to produce excellent results on a large variety of devices. Device-independent performance optimization, however, should not be confused with most current manifestations of device-independent color. Optimized performance occasionally results from reproducing calorimetric measurements; but frequently an optimized reproduction will be somewhat different from the original, particularly with photographs. Some of these differences are attributable to differences in human visual system adaptation. Development of a truly comprehensive appearance model and the reproduction of appearance would undoubtedly produce optimized reproductions in many cases. Such a model would by necessity be extremely complex, however, and might require data about surround and viewing conditions, etc., that are difficult to obtain. Also, in some cases, even the reproduction of appearance might not produce the preferred result.

For many decades, photography has evolved an empirical set of preferred reproduction goals. These goals have been driven to some extent by materials considerations, but the relatively high quality ceiling of the photographic process prevents media limitations from greatly affecting the goals. A more significant problem is that the goals were not extensively documented. Also, the relative rigidity of chemical processes prevents the goals from being tweaked in ways that would be advantageous with more flexible systems, such as digital systems. Nevertheless, the implementation of these goals in conventional photographic systems has resulted in pictorial imaging systems capable of producing preferred reproductions of excellent quality and relative insensitivity to changes in the viewing environment.

Recently, attempts have been made by the inventor to document preferred photographic reproduction goals and extend them for application to digital processing. A result of this work is the emergence of several issues commonly considered to be of major importance in photography. In particular, the effects of flare, image key (high- or low-), scene dynamic range, viewing conditions, and veiling glare are addressed. Addressing these issues for device-independent performance optimization in digital photography requires that the proposed processing strategy be scene and output viewing condition dependent. Photography deals with output viewing conditions through the use of specific media and standard recommendations for specific applications. Scene dependent issues are dealt with by engineering materials for graceful failure and by human intervention at both the image capture and processing stages. With digital systems, it is possible to shift the scene dependent intervention to smart processing algorithms.

Tone and color processing are of major importance in producing excellent images, but spatial processing can also have a significant effect on quality. The expense of manufacturing one-shot digital cameras with adequate numbers of pixels and the use of color filter arrays has increased the importance of spatial issues even further. Over the past decade, research in spatial processing has been largely separate from color processing, but device-independent performance optimization requires that the two be integrated. Optimized spatial processing is also becoming more output dependent. The spatial frequency capabilities of the output media and the viewing distance affect the degree of sharpening desired. Photographic artists and engineers have long known that mean-square-error (Wiener filter) based restoration is a start toward optimized processing, but that additional edge enhancement is needed. Recent work in information throughput based restoration is beginning to suggest new mathematical approaches to spatial processing.

In discussing processing strategies, it is important to differentiate between pictorial processing to produce specific reproduction goals, image editing, and image manipulation. Image editing implies direct manual alteration of the image data to produce some desired result. With image manipulation, all or part of an image is intentionally altered to produce a specific effect or make some point. Moving objects around, changing peoples' faces, radically changing the colors of objects, and distortions are image manipulation. Taking an image and processing it to produce a pleasing result is pictorial processing. The boundary between the two can blur when considering how much of an increase in contrast or saturation is preferred, as opposed to exaggerated. Most popular photographic image processing applications are well suited for image editing and manipulation. The processing strategy outlined here is oriented toward pictorial processing.

Reproduction Goal Choices

The first step in the processing of pictorial images is to choose the desired reproduction goal. The goal chosen needs to be realizable with the intended capture and output equipment, as well as appropriate for the intended use of the image.

Exact and Linear Reproduction

Exact and linear reproduction are where the reproduction and original are identical according to some objective, physical measurement criteria. If absolute measurement values are identical, the reproduction is exact; if relative measurement values are identical, the reproduction is linear. Exact reproduction is rarely practical, or even appropriate, with reproductions of scenes because of the differences between the scene illumination conditions and the reproduction viewing conditions. Reproductions of hardcopy on media similar to the original may be exact reproductions, because the original and reproduction can be viewed under the same conditions. However, in such cases exact and linear reproduction are functionally identical, since the measures on which linear reproduction is typically based are relative to the media white.

Appearance Reproduction

Appearance reproduction is where the reproduction and original have the same appearance when each is viewed under specific conditions. A linear match is an appearance match if the original and reproduction are on identical media and are viewed under the same conditions, and a linear calorimetric match is an appearance match if the white reference and viewing conditions remain constant. Currently, the only way to produce an appearance match under any condition is with manual, trial-and-error processing. Several appearance models have been developed that allow appearance matches to be produced under conditions that vary in specific ways, but the accuracy of the matches varies to some extent with the different models. Appearance models tend to be most successful in dealing with changes in illumination chromaticity. Unfortunately, many other changes are also important. In fact, one criteria for choosing photographic dyes is to minimize changes in appearance due to changes in illumination chromaticity, as long as the observer is adapted to the illumination. Table 1 lists a number of factors affecting the appearance of photographs.

TABLE 1

| Factors Affecting Appearance |
|---|
| Human Visual System Factors (for viewing both the scene and the reproduction) |
| Flare in the Eye |
| Adaptation State: |
| To the Overall Illumination Level |
| To the Illumination Spectral Characteristics |
| Spatial Variations in Adaptation |
| Intermediate Adaptation to Multiple Conditions |
| Factors Relating to Characteristics of the Scene or Original (as viewed by the observer, as opposed to a camera or scanner) |
| Overall Illumination Level |
| Illumination Spectral Characteristics |
| Colorants Used (if known) |
| Dynamic Range |
| Scene Key (high- or low-) |
| Scene Content |
| Factors Relating to Characteristics of the Reproduction |
| Overall Illumination Level |
| Illumination Spectral Characteristics |
| Dynamic Range and Surround |
| Media Type - Surface or Illuminant Mode |
| Surface Reflections and Veiling Glare |
| Media Color Synthesis Characteristics - Base Material and Colorant Gamut |

Preferred (Pictorial) Reproduction

In photography, the most common reproduction goal is preferred reproduction, where the aim is to produce the most pleasing image regardless of how well it matches the original. Since there is not an appearance model that deals extensively with dynamic range changes, and since preferred reproduction is highly dependent on dynamic range, it is difficult to say how much of preferred reproduction is an attempt to produce a dynamic range appearance match. If a truly comprehensive appearance model is developed, preferred reproduction may reduce to appearance matching with a slight s-shaped tone reproduction overlay and the corresponding saturation boost. For the time being, preferred reproduction processing frequently offers the best path to excellent photographic quality.

A minor consideration with preferred reproduction is that the nature of the reproduction desired depends slightly on the general media class. In normal viewing contexts, illuminant mode color images, such as are displayed on a monitor, tend to require somewhat less s-shape than surface mode color images, such as prints, with equivalent dynamic ranges. However, quantification of preferred reproduction for digital systems is just beginning, and small effects are lost in the overall uncertainty.

Preferred Reproduction and Appearance Matching

Table 2 lists the most common reproduction goals for various applications of digital photography.

TABLE 2

| Default Reproduction Goals for Digital Photography | | | | |
|---|---|---|---|---|
| Input Form -> Output Form | Scene | Transparency | Negative | Print |
| Transparency | Preferred | Linear | Preferred | Appearance |
| Print | Preferred | Appearance | Preferred | Linear |

In table 2, the default reproduction goal for producing a transparency from a print, or vice versa, is to produce an appearance match. Strictly speaking, the means for achieving this has not been developed because these media have significantly different dynamic ranges when viewed under typical conditions. However, a roundabout approach can be used to achieve the desired result. If it is assumed that the original exhibits preferred reproduction, it is possible to undo this reproduction back to a linear space, and then implement preferred reproduction on the new media. The result will be very close to an appearance match. This type of processing can be done using one LUT in an appropriate, standard RGB color space, assuming the output device can render the RGB data correctly.

sRGB Color Space Processing

Device performance optimization requires that pictorial processing algorithms can interpret the meaning of the digital image data they are presented. If the processing algorithms are specific to particular devices, there are various ways in which this information can be communicated. Device-independent performance optimization requires that the meaning of the data be understandable regardless of the device. The only way to accomplish this is to establish some sort of standard data space.

Most current color management paradigms make use of a perceptual device-independent color space, such as CIE XYZ or CIE L*a*b*. The motivation for this color space type is that images are meant to be viewed, and color descriptions based on psychophysical measurements best predict appearance. This approach is theoretically indisputable if it is possible to construct transforms that accurately convert image data to a psychophysical space, and if the psychophysical space accurately describes appearance. Unfortunately, it is not always possible to construct such transforms, and the lack of a totally comprehensive appearance model may prevent current psychophysical descriptions from predicting appearance. The use of strict perceptual color spaces can also result in fairly intensive processing requiring high precision, since the image data may be transformed through a non-native state.

Alternatives to perceptual color spaces are physically standardized, but more device native "color" spaces. Such spaces describe the physical meaning of the data. It may also be possible to correlate these physical descriptions to current appearance model descriptions for limited sets of viewing conditions. Obvious candidate spaces of this type are standard RGB spaces. Of those available, the most appropriate are the monitor spaces. Monitor spaces have wide gamuts, most images are viewed on a monitor at some point, a great deal of manual processing is accomplished using monitor feedback, and an internationally standardized monitor space already exists, as well as correlations to appearance under specific viewing conditions. Standard monitor data, when printed on photographic media using devices with independent channels, also tends to correlate reasonably well with Status A densitometry. This means that photographically derived preferred reproduction models can be applied. It is also interesting to note that recent work in the color appearance area is indicating that the use of spectrally sharpened visual response functions is advantageous. These functions are much closer to RGB than the unsharpened visual (cone) response functions. Table 3 summarizes the advantages and disadvantages of the two types of standard color data spaces.

TABLE 3

Advantages and Disadvantages of
Perceptual and sRGB Color Spaces

CIE XYZ and L*a*b* Color Spaces
Advantages
Excellent color appearance reproduction if the capture is colorimetric or the colorants used in the original are known, and the viewing conditions and media dynamic range are appropriate.
Can reproduce color using unusual colorants as long as the viewing conditions and media dynamic range are appropriate.
L*a*b* is reasonably uniform perceptually.
Disadvantages
The color reproduction accuracy advantage is lost if the capture is not colorimetric or the colorants used in the original are not known, as is usually the case with digital cameras.
Color appearance prediction may be poor if the output media dynamic range and/or viewing conditions are significantly different from the original.
Processing may be more extensive and require higher precision.
No model is available for preferred reproduction.
If all the gamut benefits are to be realized, the image data may need to be stored at high precision, or the raw data stored with a transform.
sRCB Color Space
Advantages
Similar to many device native color spaces. Transformations to sRGB tend to be simpler, more accurate, and require less precision for storage. It is less necessary to save the raw data with a transform. Transformations from sRGB to output device spaces also tend to be simpler.
Since sRGB image data can also be described perceptually, the advantages of the perceptual color spaces can be applied.
Photographic preferred reproduction models can be applied.
Reasonably uniform perceptually.
Relatively independent channels help with signal-to-noise issues in capture.
May be similar to the spectrally sharpened tristimulus metrics to be used in future appearance models.
Disadvantages
Colors that are out of the monitor gamut are expressed using negative values, requiring larger data volumes.

The standard monitor data approach provides a common ground to link perception to the native physical behavior of devices based on RGB and CMY capture or colorants. Most devices that produce outputs of varying dynamic range use colorants of these types. Output devices that use other colorants, but have dynamic ranges of around 100:1 can also be accommodated since the monitor data can be correlated with perceptual metrics at the fixed dynamic range. Various forms of standard monitor RGB have been successfully used by practitioners of digital photography for several years. Recently, a few major corporations have formalized this approach by proposing a specific standard monitor color space, sRGB. This proposal paves the way for the use of a standard RGB space for pictorial digital image processing (PDIP).

Digital Camera Processing Pipeline

The following is one embodiment of a proposed optimized pipeline for PDIP. It combines many aspects of my invention that are not required to be used together. Specific capture and output devices, quantities and color spaces included in this pipeline are exemplary in nature and are not intended to limit the scope of the invention in any way.

Preliminary Measurements

Figure 2:
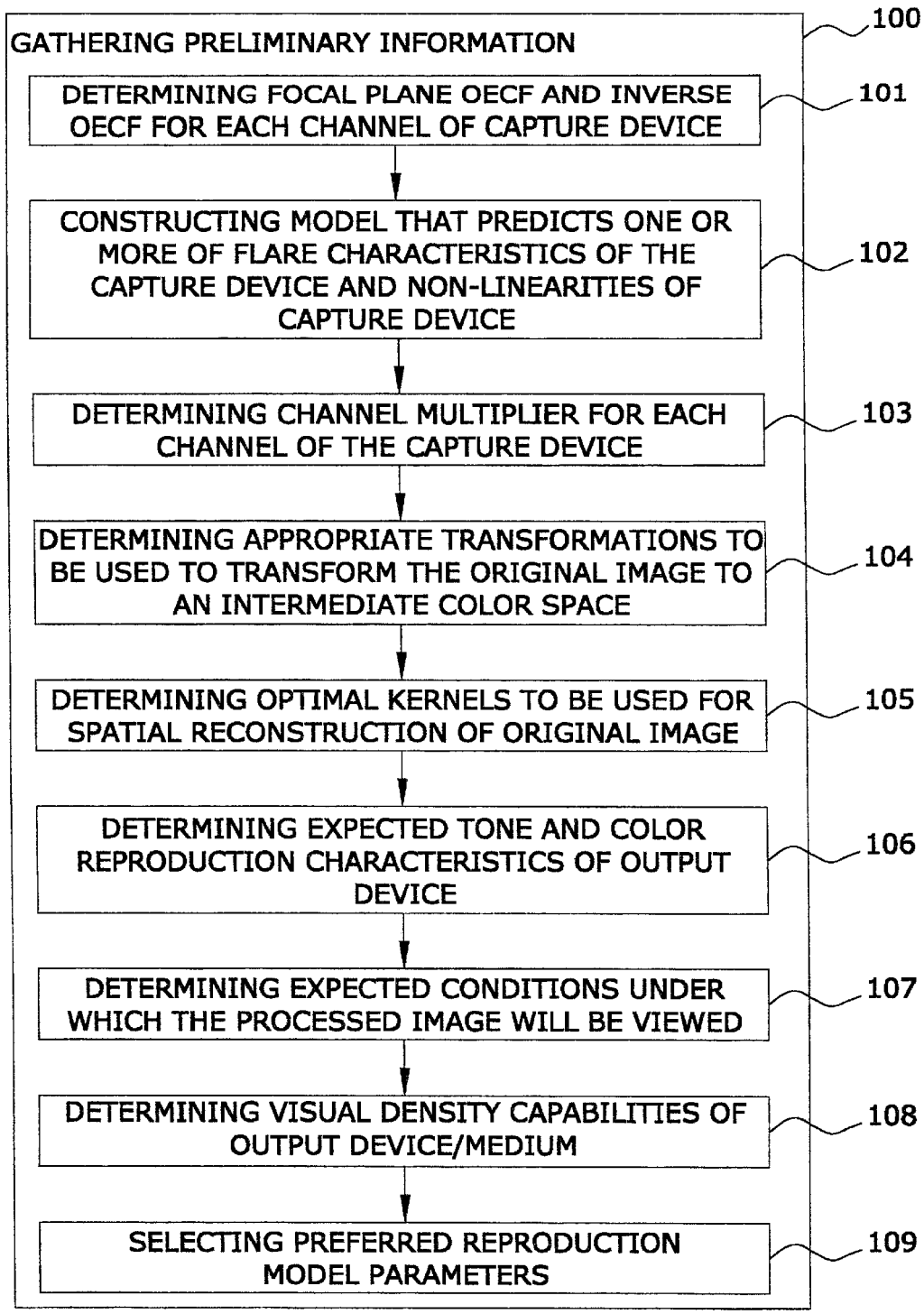
FIG. 2 is a schematic flow chart of the step of gathering preliminary information illustrated in FIG. 1.
Figure 3:
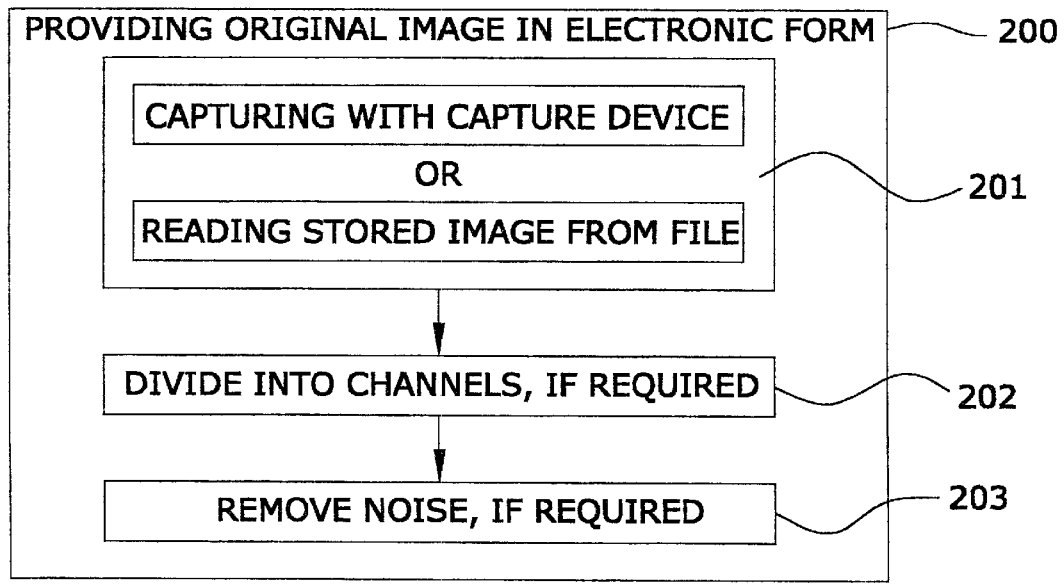
FIG. 3 is a schematic flow chart of the step of providing an original image illustrated in FIG. 1.
Figure 4:
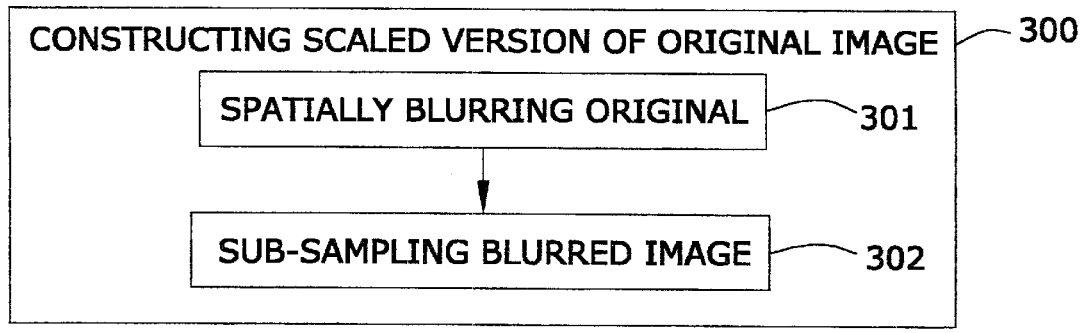
FIG. 4 is a schematic flow chart of the step of constructing a scaled image from or a scaled version of the original image illustrated in FIG. 1.
Figure 5:
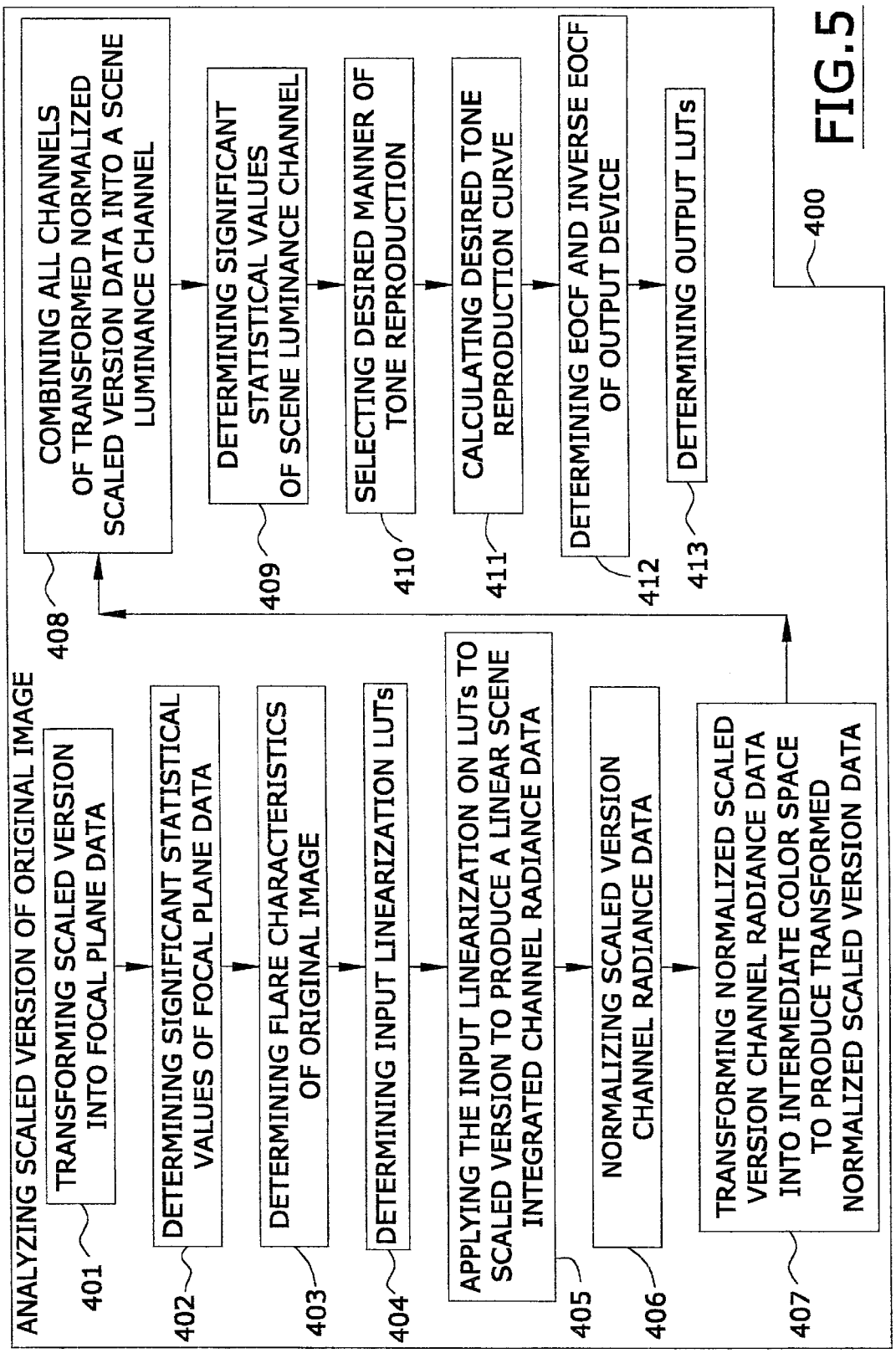
FIG. 5 is a schematic flow chart of the step of analyzing the scaled image or scaled version illustrated in FIG. 1.
Figure 6:
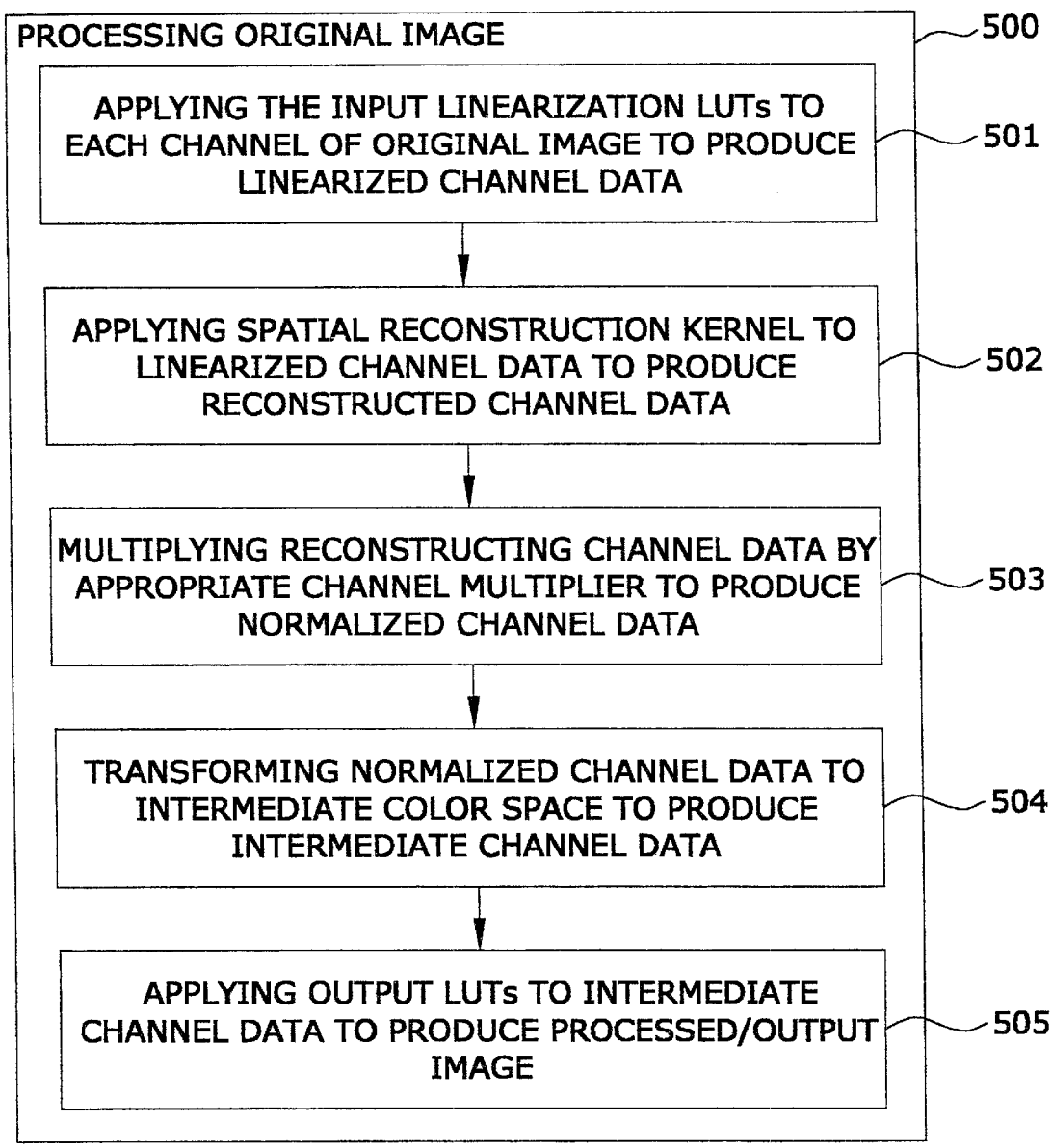
FIG. 6 is a schematic flow chart of the step of processing the original image to produce a processed or output image illustrated in FIG. 1.
Figure 7:
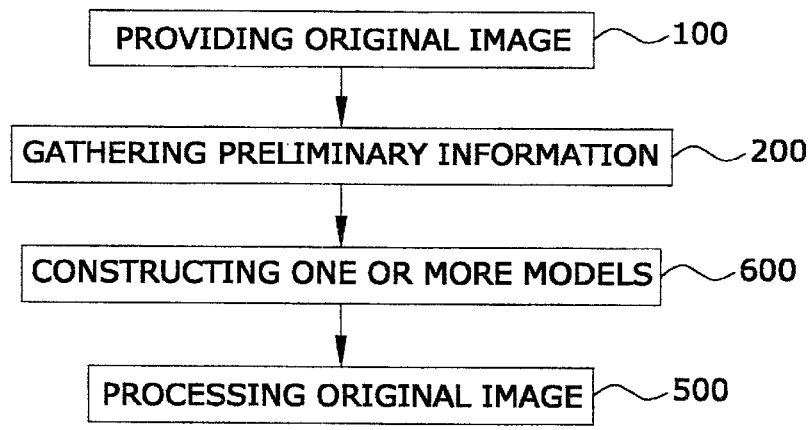
FIG. 7 is a schematic flow chart of another embodiment of the invention.
Figure 8:
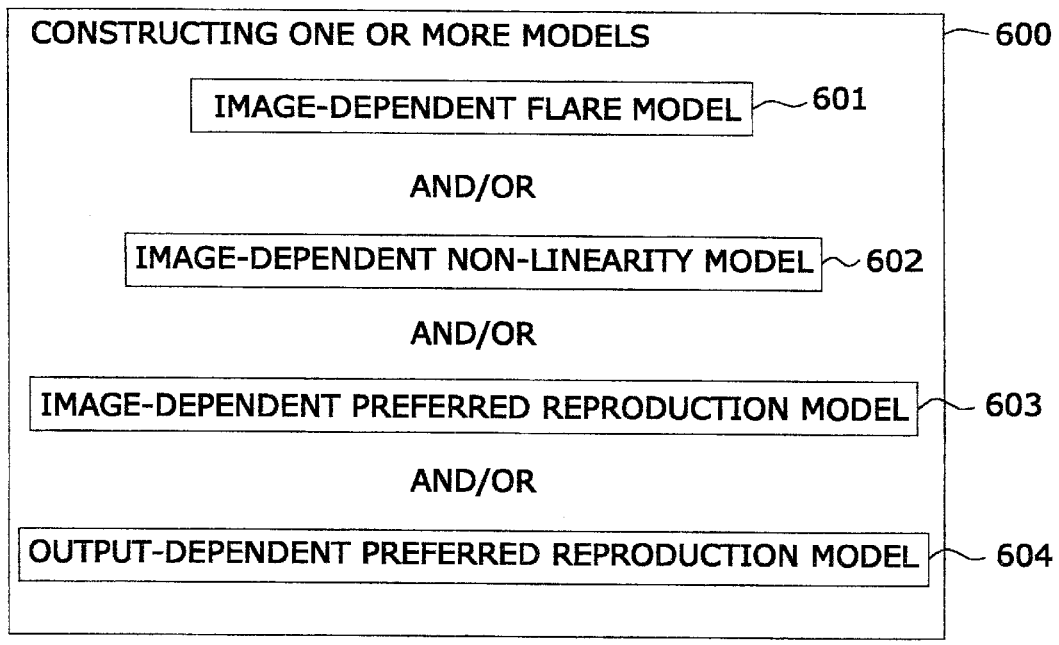
FIG. 8 is a schematic flow chart of another embodiment of the invention.
Figure 9:
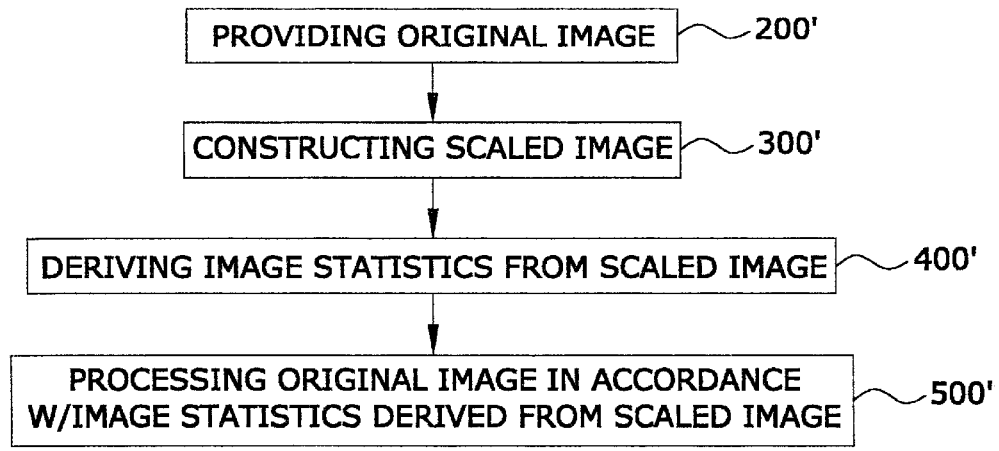
FIG. 9 is a schematic flow chart of another embodiment of the invention.
Figure 10:
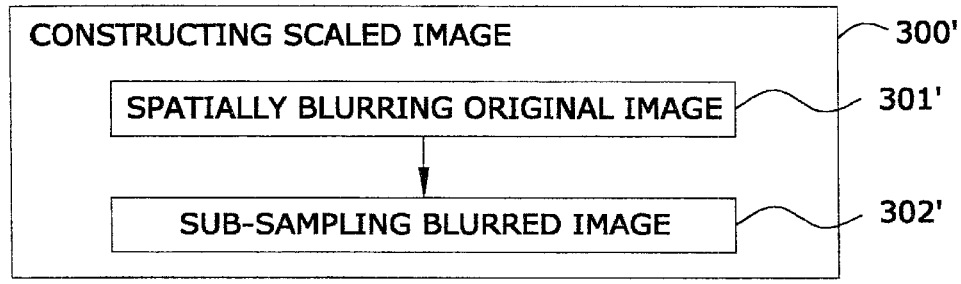
FIG. 10 is a schematic flow chart expanding on the embodiment shown in FIG. 9.
Figure 11:
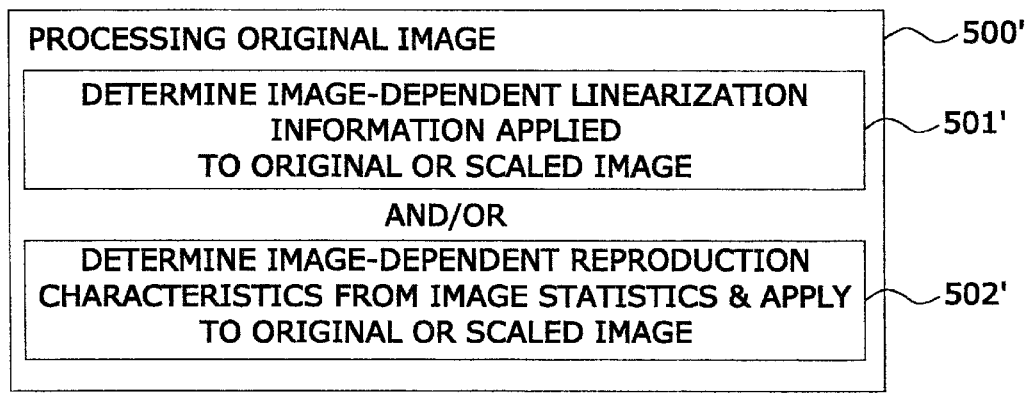
FIG. 11 is a schematic flow chart expanding on the embodiment shown in FIG. 9.
Figure 12:
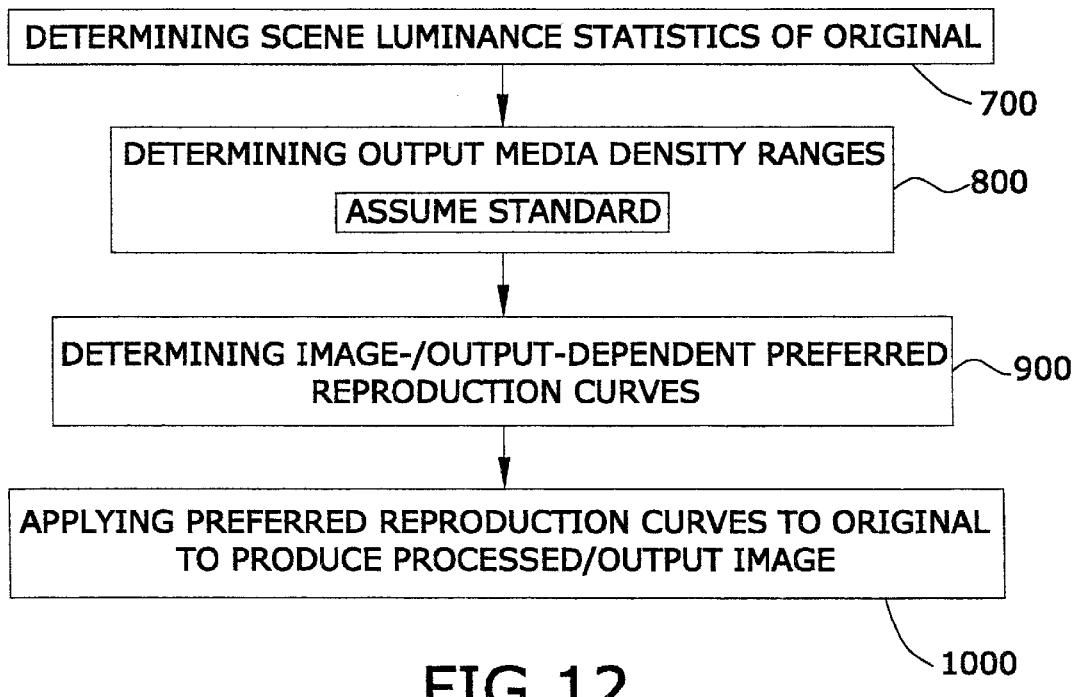
FIG. 12 is a schematic flow chart of another embodiment of the invention.
Figure 13:
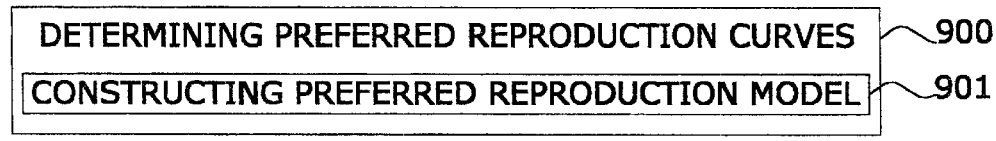
FIG. 13 is a schematic flow chart expanding on the embodiment shown in FIG. 12.
Figure 14:
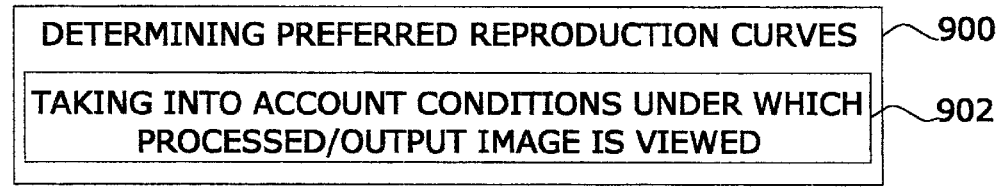
FIG. 14 is a schematic flow chart expanding on the embodiment shown in FIG. 12.
Figure 15:
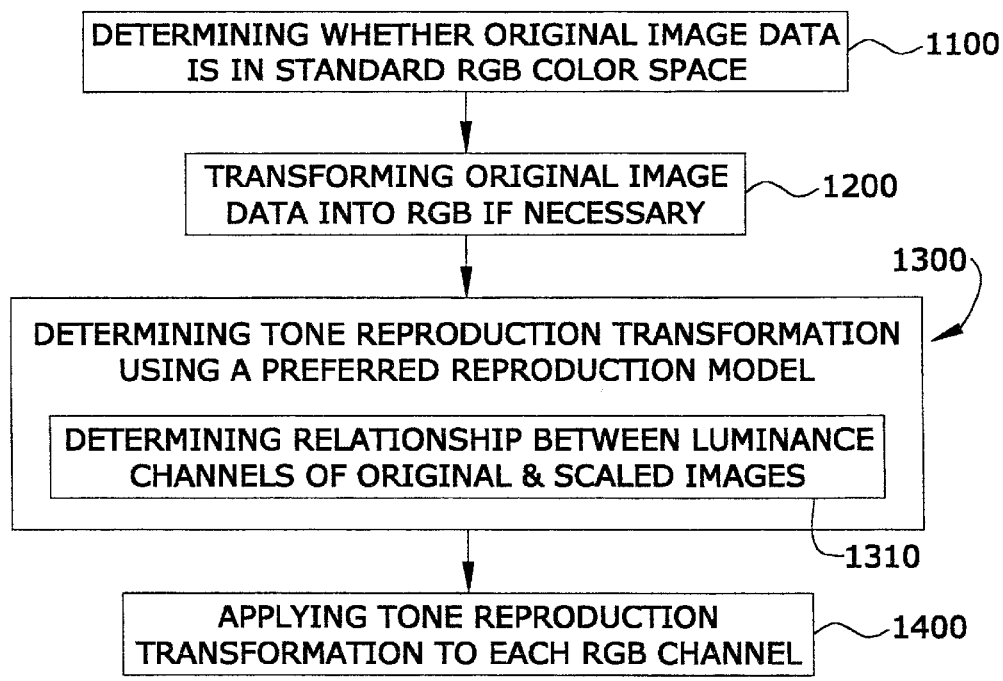
FIG. 15 is a schematic flow chart of another embodiment of the invention.
Figure 16:
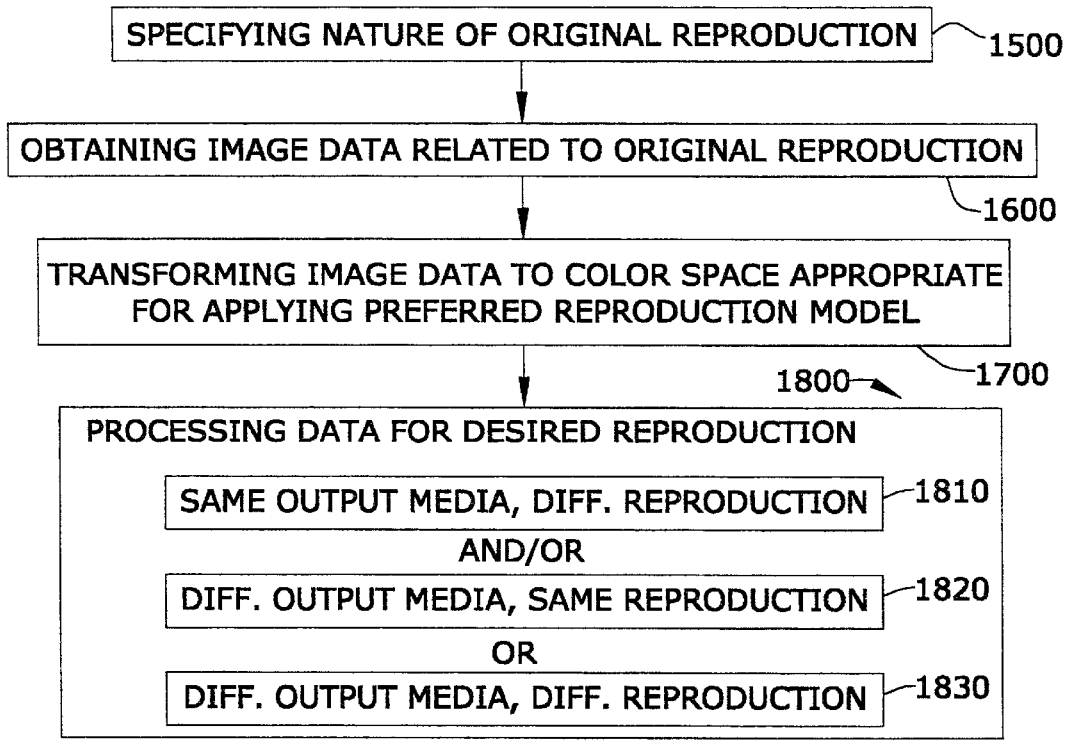
FIG. 16 is a schematic flow chart of another embodiment of the invention.
Figure 17:
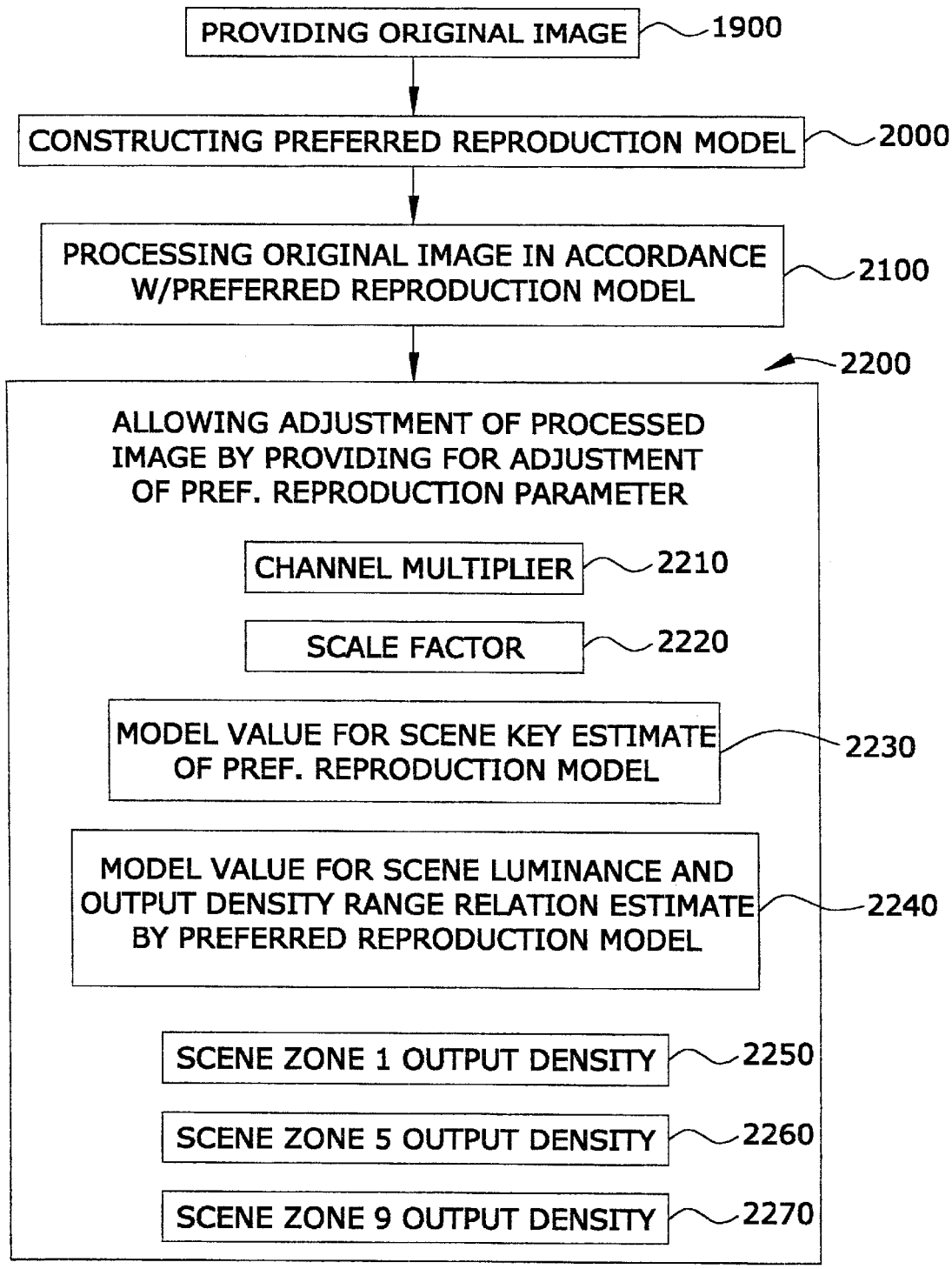
FIG. 17 is a schematic flow chart of another embodiment of the invention.

The gathering of preliminary information is shown schematically in FIGS. 1 and 2 and is represented by boxes 100 and 101–109.

1. Set the camera gain(s) and offset(s) as they will be set during use, hopefully the optimum settings. Ideally, the offset should be set so that a focal plane exposure of zero produces a digital level of zero after bias and dark current subtraction. The spacing of the levels should be chosen so that virtually all the information the camera can capture is recorded with minimal quantization error. A rule of thumb is that the standard deviation, expressed in digital levels, of any even focal plane exposure, should be at least 0.5 after all fixed pattern noise removal processing. Higher standard deviations are also acceptable, but will require more bits for image data storage.

2. Determine the camera fixed pattern noise characteristics, such as dark current and pixel sensitivity non-uniformity.

3. Measure the camera response characteristics to determine the focal plane OECF for each channel for each illumination type of interest. Variations due to illumination type can usually be dealt with using a single OECF curve shape and channel multipliers. For example, a particular camera may have relative channel sensitivities of 0.6, 0.9, and 1 with 5500 K daylight illumination and 0.2, 0.7, and 1 with 3200 K tungsten illumination. If channel multipliers are used, it is possible to determine a mathematical model to predict multipliers for intermediate illumination types.

4. Determine the camera OECFs (101) for a variety of scenes with known spatial and spectral (or channel) radiance distributions. Use this information in conjunction with the focal plane OECF measurements to devise a model that estimates flare and other image-dependent non-linearities based on focal plane image statistics (102).

5. Determine a matrix to transform the linearized camera data into the standard linear RGB space, using the methods described in the (most current version of the draft or international standard derived from the) new ISO work item proposal draft.

6. Measure the linearized camera spatial frequency responses and noise power spectra for each channel in the horizontal and vertical directions. Determine a reasonable processing kernel size and construct a maximum information throughput spatial reconstruction kernel. Note that each channel may require a different reconstruction kernel, and that the ideal reconstruction kernel may vary with focal plane exposure.

7. Measure the neutral EOCF, the spatial frequency response, and the noise power spectrum of the output devices on which the image data may be rendered. If an output device has minimal noise, it may not be necessary to measure the noise power spectrum. Spatial frequency response and noise power spectrum measurements are also not necessary with halftoning output devices that incorporate perceptual noise suppression and sharpening into the halftoning algorithm. If the output device is not known, the EOCF for sRGB can be used.

Processing Step 1: Determination of Flare and Scene Key

1. Divide up the image data into the color channels, if required (202).
2. Pixel average (boxcar filter (301') and sub-sample (302')) each channel to obtain scaled versions of the original image, and preferably store the scaled images. Other blur filters can be used, such as Gaussian and median. The scaled images are preferably reduced images of 10,000 to 20,000 digital values. Previous work has indicated that reduced images with a short dimension of about 100 pixels are optimal for most subject matter and output forms. The pixel averaging is done in what is assumed to be an approximately logarithmic gamma type camera data space because geometric means are preferable to arithmetic means. If the camera is linear, it would be best to convert the digital values to a log or gamma space prior to the pixel averaging, and then back again, although the effect of this rather intensive additional processing should be minimal.
3. Transform the reduced image values to focal plane exposures using the inverse focal plane OECFs for each channel, using the appropriate gains and/or channel multipliers for the scene or original illumination type (401).
4. Determine the minimum, maximum, and mean exposures, and the minimum, maximum, and mean log exposures for each channel. Estimate the image-specific camera OECFs for each channel based on these statistics (or a subset thereof) using the previously determined flare/non-linearity model, and the focal plane OECFs for the illumination type used (402).
5. The scene key is determined by subtracting the average of the minimum and maximum log exposures, which is the expected mean log exposure, from the mean log exposure.

Processing Step 2: Determination of Scene Zone 1, Zone 5, and Zone 9 Luminances

1. Transform the reduced image values into linear standard RGB scene values using the processing sequence as outlined below in Processing Steps 4 and 6 (404–407).
2. Combine-the linear standard RGB scene values into a linear scene luminance channel using an equation appropriate for the RGB color space used (408). For example, if the standard color space is sRGB, the luminance conversion equation from ITU-R BT.709 is appropriate.
3. The minimum reduced image luminance is assumed to be the scene Zone 1 luminance, the arithmetic mean luminance the Zone 5 luminance, and the maximum luminance the Zone 9 luminance (409).

TABLE 4

| Zone Designations of Perceptual Tone Categories |
|---|
| Zone 0 - absolute black or maximum density. |
| Zone 1 - edge of detail in black. |
| Zone 2 - texture in black. |
| Zone 3 - average dark objects. |
| Zone 4 - dark midtones. |
| Zone 5 - medium midtone or middle gray. |
| Zone 6 - light midtones. |
| Zone 7 - average light objects. |
| Zone 8 - texture in white. |
| Zone 9 - edge of detail in white. |
| Zone 10 - absolute white or base white (with any fog or stain). |

Processing Step 3: Determination of Output Table

1. Select the output device and pixel pitch for the desired rendering. If the output device is not known, assume a standard monitor as represented by sRGB.

At this point, the method proceeds along either a linear reproduction path or a preferred reproduction path, with the desired path depending on the particular application.

Linear Reproduction:

2a. Determine the digital level that produces a nominal 20% reflectance, or 20% transmittance relative to the base transmittance, or 20% of the white luminance, on the output device. This is designated as the midtone reflectance level. On devices with dynamic ranges different from the 100:1 total dynamic range specified for sRGB, or devices which have the same dynamic range but different viewing conditions, the perceptual midtone reflectance, transmittance, or luminance factor may be different from 20%.

3a. Determine a LUT that will produce an output with reflectances (or transmittances or luminance factors, as appropriate) that are a constant multiplier of the scene luminances, with the constant chosen so that the Zone 5 scene luminance reproduces at the medium midtone. The input to this LUT will be standard linear RGB scene values, the output will be standard (but not necessarily linear, depending on the output device EOCF) RGB digital code values.

Preferred Reproduction:

It should be understood that the following description of preferred reproduction is only one way to accomplish preferred reproduction in my overall method. Many other preferred reproduction methods can be used in the overall strategy and still fall within the scope of my invention.

As will be seen and as indicated above, the preferred reproduction model can even be a linear reproduction model or an appearance reproduction model. It should also be understood that where I discuss reproduction and other curves, I use "curve" in a broad sense since these are very complex, multidimensional mathematical functions. My use of the word "curve" includes look-up tables (LUTs), transformations, and matrices.

2b. Determine the maximum Zone 1 density capability of the output medium. This will be 90% of the maximum density capability for most media. For self-luminous displays, such as monitors, "density" is equal to the negative base ten logarithm of the luminance factor of the monitor, relative to the monitor white point.

3b Determine the viewing condition illumination level and ambient illumination level. This step may not always apply, depending on the output medium to be used, as well as other factors.

4b. Determine the lesser of: the maximum Zone 1 density capability of the output medium, or the desired Zone 1 density based on the viewing conditions. This will be the desired Zone 1 density.

5b Determine the desired Zone 9 density, which is typically 0.04 above the minimum density for reflection hardcopy and monitors, and 0.06 above the minimum density for transparencies to be viewed on a light table or projected in a darkened room.

6b. Calculate the preferred reproduction relationship between the scene luminances and output densities. The details of this calculation are as follows:

6.1b The following quantities are needed for the calculation of the scene specific preferred tone reproduction curve:

Zone 1 Log Luminance—Z1logL

Zone 9 Log Luminance—Z9logL

Mean Log Exposure—$\overline{logH}$

Expected Mean Log Exposure—$\langle \overline{logH} \rangle$

Zone 1 Output Density—Z1D

Zone 9 Output Density—Z9D 6.2b The quantities listed in the preceding step can be used to calculate the following important values:

Scene Pictorial Dynamic Log Range – $\Delta logL$ (1)
$$\Delta logL = Z9logL - Z1logL$$

Output Pictorial Dynamic Log Range – $\Delta D$ (2)
$$\Delta D = Z1D - Z9D$$

Flex Factor Multiplier– $FFM$ (3)
$$FFM = \frac{\Delta logL - \Delta D + 2}{2.34}$$

Shift Factor Multiplier– $SFM$ (4)
$$SFM = \frac{\overline{logH} - \langle \overline{logH} \rangle}{0.6}$$

The preferred tone reproduction curve will be determined by adding an S-shaped flex to a reproduction curve that is linear with respect to scene log luminance and output density. The amount of flex depends on the scene and output dynamic ranges. The flexed curve will then be shifted to compensate for low or high mean reflectances (as determined using the reduced image log exposure statistics).

6.3b The manipulation of the base reproduction curves is accomplished using zones. Numerical values are added to the base zone values to produce the desired zone values. The normalized base zone values, without any flex or shift, are provided in tables 5 and 6.

TABLE 5

Base Zone Log Luminances (BZLLs)

| Zone 1 | Zone 2 | Zone 3 | Zone 4 | Zone 4.5 | Zone 5 | Zone 6 | Zone 7 | Zone 8 | Zone 9 |
|---|---|---|---|---|---|---|---|---|---|
| 0 | 0.1613 | 0.3118 | 0.4839 | 0.5645 | 0.6452 | 0.7688 | 0.8763 | 0.957 | 1 |

TABLE 6

Base Zone Densities (BZDs)

| Zone 1 | Zone 2 | Zone 3 | Zone 4 | Zone 4.5 | Zone 5 | Zone 6 | Zone 7 | Zone 8 | Zone 9 |
|---|---|---|---|---|---|---|---|---|---|
| 1 | 0.8387 | 0.6882 | 0.5161 | 0.4355 | 0.3548 | 0.2312 | 0.1237 | 0.043 | 0 |

6.4b The amount of flex in the desired tone reproduction curve is based on the ratio of the scene pictorial dynamic range to the output pictorial dynamic range. The flex is applied by adding flex zone values to the normalized base zone log luminances (BZLLs) listed in table 5.

6.4.1b. The standard flex factors (SFFs), listed in table 7, are for a standard scene pictorial dynamic range of 160:1 and a standard output pictorial dynamic range of 72:1.

TABLE 7

Standard Flex Factors (SFFs)

| Zone 1 | Zone 2 | Zone 3 | Zone 4 | Zone 4.5 | Zone 5 | Zone 6 | Zone 7 | Zone 8 | Zone 9 |
|---|---|---|---|---|---|---|---|---|---|
| 0 | 0.087 | 0.086 | 0.036 | 0.004 | −0.022 | −0.051 | −0.063 | −0.048 | 0 |

6.4.2b. The flex zone values are determined by multiplying the SFFs by the FFM.

6.4.3b. The scene specific preferred zone log luminances are determined by adding the flex zone values to the BZLLs listed in table 5, multiplying the sums by the $\Delta logL$, and adding the Z1logL (see equation 5).

$$ZoneLogLuminances = Z1logL + \Delta logL(BZLL's + FFM(SFF's)) \quad (5)$$

6.5b The amount of shift in the desired tone reproduction curve is based on the difference between the mean log exposure and the expected mean log exposure.

6.5.1b. If the mean log exposure is lower than the expected mean log exposure, the scene is a low key scene. The standard low key shift factors (SFs) are listed in table 8.

TABLE 8

Standard Low Key Shift Factors

| Zone 1 | Zone 2 | Zone 3 | Zone 4 | Zone 4.5 | Zone 5 | Zone 6 | Zone 7 | Zone 8 | Zone 9 |
|---|---|---|---|---|---|---|---|---|---|
| 0 | 0.1075 | 0.1344 | 0.1129 | 0.0914 | 0.0753 | 0.0538 | 0.0323 | 0.0108 | 0 |

These factors are based on a mean log exposure that is 0.6 log units lower than the expected mean log exposure.

6.5.2b. If the mean log exposure is higher than the expected mean log exposure, the scene is a high key scene. The standard high key SFs are listed in table 9.

TABLE 9

Standard High Key Shift Factors

| Zone 1 | Zone 2 | Zone 3 | Zone 4 | Zone 4.5 | Zone 5 | Zone 6 | Zone 7 | Zone 8 | Zone 9 |
|---|---|---|---|---|---|---|---|---|---|
| 0 | 0.0323 | 0.0484 | 0.0699 | 0.0806 | 0.086 | 0.086 | 0.0753 | 0.0484 | 0 |

These factors are based on a mean log exposure that is 0.6 log units higher than the expected mean log exposure.

6.5.3b. The shift zone values are determined by multiplying the appropriate standard shift factors by the SFM. The sign of the SFM is also used to determine which set of shift factors to use. A negative sign means that the low key shift factors should be used, and a positive sign means that the high key shift factors should be used.

6.5.4b. The scene specific preferred zone densities are determined by adding the shift zone values to the base zone densities (BZDs) listed in table 6, multiplying the sums by the $\Delta D$, and adding the Z9D (see equation 6).

$$ZoneDensities = Z9D + \Delta D(BZD's + |SFM|AppropriateSF's) \quad (6)$$

7b. Determine a LUT that will produce preferred reproduction on the selected output device, or a standard monitor.

Processing Step 4: Scene Linearization

1. Subtract and divide out the fixed pattern noise (if not already done).
2. Construct input linearization tables by taking each possible digital value through the image-specific inverse camera OECFs.
3. Convert the pixel digital values to linear scene channel radiances.

Processing Step 5: Spatial Restoration

Note: This step is placed here because most spatial restoration techniques assume the data is in a linear radiance space. Also, it is advantageous to perform the spatial reconstruction and the transformation to the standard linear RGB color space in the same operation. This processing should be placed elsewhere in the pipeline if the reconstruction algorithm is designed to deal with nonlinear data, either as output by the capture device, or as will be input to the output device.

1. Apply the maximum information throughput (or other) spatial reconstruction kernel. As noted above, this kernel may also perform the transformation to a standard linear RGB space (see Processing Step 6).
2. Apply any morphological or other nonlinear processing to the image to reduce artifacts (most common with CFA camera data).

Processing Step 6: Transformation to a standard linear RGB color space Note: As stated above, this step and step 5 may be done simultaneously.
1. Apply the linear radiance to standard linear RGB color space transformation matrix.

Processing Step 7: Output Processing
1. Apply the desired output LUT. The data output by this step will be standard (but probably not linear) RGB digital code values. If the output EOCF is the sRGB EOCF, the data will be sRGB data.
2. Apply any subsequent output processing, such as sharpening, noise reduction, transformation of the standard RGB data to another color space, application of output device-specific color LUTs, halftoning, etc.

Subsequent Processing

Image data that has been processed to a particular reproduction goal on one output device can be processed for another output device by undoing the processing back to the point where the processed data is common to both output devices. Changes in reproduction goal are similar. A new reproduction goal on the same output device can be viewed as a different output device by the processing.

Processing Strategy for Scanning

Scanners can be viewed as digital cameras that are used to make reproductions of transparencies and prints, or as part of digital image capture systems that use film for the initial capture. If the reproduction goal is relative to the transparency or print, the former viewpoint is correct, and the scanner data can be processed in the same way as digital camera data. If the reproduction goal is relative to the original scene, the latter viewpoint is more appropriate. In this case it is necessary to consider the film camera, film, film processing, and scanner as part of the capture system. The linearization and color characterization must be performed on the entire system.

Image data from scans of negatives must generally be related to the scene, so negative film capture should be considered as part of a larger system. However, the linearization and color characterization of film/scanner capture systems is complicated by film/process system variability. Also, it is important to remember that film does not capture calorimetric information about the scene. Even if the colorants used in the scene are known and limited in number to the number of film capture channels, film/process system variability typically prevents accurate determination of calorimetric values. It is better to attempt to produce the desired reproduction directly from the film capture channels, which are usually RGB.

With scans of negatives, it is also possible to relate a reproduction goal to a conventional photographic print of the negative. This is equivalent to relating to the scene, and then using the negative-print system tone and color reproduction characteristics as the preferred reproduction model. However, such a model will be limited by characteristics of conventional photographic systems, some of which may not be desirable and can be ignored in digital processing. Another use for conventional photographic system tone and color reproduction models is to undo the preferred reproduction applied by conventional photographic systems so that the scanner data can be related to the scene. However, choosing to relate to the scene instead of the transparency or print implies that the image was selected for the scene content, rather than for how the scene reproduced in the transparency or print. The appropriate viewpoint must be chosen for the processing pipeline to create the desired reproduction.

In professional photography, most scenes are captured on transparency film, and images are selected, at least to some extent, based on the appearance of the transparency, as opposed to the scene content. The transparency may therefore be the original to be reproduced. This reproduction is aided by the fact that, since the colorants used in the transparency are known and limited, it is possible to obtain calorimetrically accurate values from the scanner data. If the transparency is to be printed on reflective media, an appearance match must still be created using standard RGB channels, but the colorimetric accuracy will result in a better appearance match (to the transparency, not the scene) than if the RGB channels were not related to color matching functions. However, if the transparency is reproduced on another type of media, either reflective or transmissive, matching of the colors may not be preferred since the colors in the original transparency may be preferred only on the particular transparency material.

In amateur photography, most scenes are captured on negative film, and images are selected, at least initially, based on the appearance of the scene. In some respects negatives are better suited for film capture than positives. They have a larger input dynamic range, more exposure latitude, and the unwanted absorptions of the film dyes are corrected using masks, making the RGB channels in a negative more orthogonal. Also, the output dynamic range of negatives is lower than with transparencies, reducing flare and the dynamic range requirements for the scanner. Unfortunately, many scanners have difficulty producing good image data from negatives because they are designed to scan transparencies. The level spacing is too large for the lower dynamic range, and the processing software does not know what to do with the reversed and offset RGB color data. Another complication is that negative dyes are designed to modulate the red channel information at longer wavelengths. Negatives should be scanned using channels with spectral sensitivities that allow Status M densities to be obtained, as opposed to the Status A densities appropriate for transparencies.

Print scanning is complicated by surface reflections which are highly dependent on the scanner optical geometry. For preferred reproduction, it is best to scan the print in a way that minimizes surface reflections, such as by using the geometry specified for reflection densitometry measurements. If linear calorimetric reproduction is desired, it is necessary to simulate the viewing geometry in the scanner. Ideally, different scanner geometries should be used for different viewing conditions. This is rarely practical, however, and the most common measurement approach for calorimetric scanner characterization is to use an integrating sphere, frequently with a gloss trap. However, measurements taken using this type of geometry will be inferior for producing preferred pictorial reproduction. Another approach is to use the geometry for reflection densitometry and simulate veiling glare. This approach is rare because a model that can simulate the veiling glare characteristics of the material scanned is required.

User Adjustments

A comprehensive strategy for PDIP must allow for user input to the final result. No automated routine can account for individual taste. Also, the strategy presented here does not deal with the nature of objects in images. These objects (such as people) can have a significant effect on the desired reproduction. Object recognition and classification is probably the next frontier in automated image processing.

Current processing software does not provide for the quick and easy adjustment of reproduction. This is because it is necessary to have a processing approach in place before user adjustments based on physical measurements and models can be added. Automated image processing to preferred reproduction is a major advance in digital photography, but quick, easy, and intuitive tweaking of the result is almost equally important. Table 10 lists a variety of user adjustment options. These options are divided into levels, so that the novice user will see only the simple controls, while more advanced users can choose to view more options. Structures of this type are common in many software applications. In all cases it is assumed that visual feedback for all choices is provided, that user preferences can be stored, that all technical and device information that can be transferred automatically is, and that the user can request that default values be selected where not provided and used for all values, for some values, or the interface ask each time. Complete descriptions of how each adjustment affects the processing of the image data should be available for advanced users.

TABLE 10

Manual Adjustment Options

Level 0 Choices:
Illumination source - accept default or device estimation, specify type, or use a neutral balance feature.
Reproduction goal - linear or preferred.
Output device
(default to sRGB, or to a device specified in image file).
Level 1 Adjustments:
Brightness Slider
Linear reproduction - adjusts the output density of the scene arithmetic mean (Zone 5) luminance.
Preferred reproduction (fine) - adjusts the amount of high- or low-key shift.
Preferred reproduction (coarse) - implements a gamma type brightness shift.
Contrast Slider
Linear matching - disabled.
Preferred reproduction (fine) - adjusts the amount of flex.
Preferred reproduction (coarse) - adjusts the scaled image scale factor.
Color Balance Slider (3 options)
Adjust using color temperature slider.
Adjust using tri-linear coordinate (RGB) joystick.
Adjust using rectangular coordinate (opponent color) joystick.
Sharpness Slider
Level 2 Adjustments:
Linear reproduction
Choose to base the midtone on the geometric mean.
Preferred reproduction
For each channel, allow adjustment of the scaled image scale factor,
Zone 1 and Zone 9 output density, and flare factor.
Choose to base the key on the arithmetic mean.
Level 3 Adjustments:
Apply user specified look-up-tables and matrices
Specify look-up-table to convert each channel to scene radiance.
Specify matrix to convert to different channels for output.
Specify look-up-table to produce desired reproduction on output.

The tools and techniques required for the improved, efficient, and automated processing of pictorial images are becoming available. If processing of this type is implemented, the quality of digital photographs should surpass that of conventional photographs in most areas, resulting in rapid acceleration in the acceptance of digital photography.

List of Reference Numerals and Corresponding Elements of Exemplary Embodiments

| | |
|---|---|
| 100 | Step of gathering preliminary information |
| 101 | Sub-step of determining OECFs and OECF inverses for capture device |

-continued

List of Reference Numerals and Corresponding Elements of Exemplary Embodiments

| | |
|---|---|
| 102 | Sub-step of constructing model |
| 103 | Sub-step of determining channel multipliers |
| 104 | Sub-step of determining transformation to intermediate color space |
| 105 | Sub-step of determining spatial reconstruction kernels |
| 106 | Sub-step of determining expected tone/color reproduction characteristics of output device |
| 107 | Sub-step of determining expected viewing conditions |
| 108 | Sub-step of determining output device/medium visual density capabilities |
| 109 | Sub-step of selecting preferred reproduction model |
| 200 | Step of providing original image |
| 201 | Sub-step of capturing with capture device or reading from file |
| 202 | Sub-step of dividing original image into channels, if required |
| 203 | Sub-step of removing noise, if required |
| 300 | Step of constructing scaled image/version of original image |
| 301 | Sub-step of spatially blurring original image |
| 302 | Sub-step of sub-sampling original image |
| 400 | Step of analyzing scaled image/version |
| 401 | Sub-step of transforming scaled image into focal plane data |
| 402 | Sub-step of determining significant statistical values of focal plane data |
| 403 | Sub-step of determining flare characteristics or non-linear characteristics of original image |
| 404 | Sub-step of determining input linearization information (LUTs or functions) |
| 405 | Sub-step of applying input linearization information to scaled version to produce linear scene integrated channel radiance data |
| 406 | Sub-step of normalizing scaled version channel radiance data |
| 407 | Sub-step of transforming normalized/balanced channel radiance data into intermediate color space to produce transformed normalized scaled version data |
| 408 | Sub-step of combining all channels of transformed normalized scaled version data into a scene luminance channel |
| 409 | Sub-step of determining significant statistical values of scene luminance |
| 410 | Sub-step of selecting desired manner of tone reproduction |
| 411 | Sub-step of calculating desired tone reproduction |
| 412 | Sub-step of determining EOCF and inverse EOCF of output device |
| 413 | Sub-step of determining output LUTs |
| 500 | Step of processing original image |
| 501 | Sub-step of applying input linearization information to original image to produced linearized channel data |
| 502 | Sub-step of applying spatial reconstruction kernels to linearized channel data to produce reconstructed channel data |
| 503 | Sub-step of multiplying reconstructed channel data be channel multiplier to produce normalized/balanced channel data |
| 504 | Sub-step of transforming normalized/balance channel data to intermediate color space to produce intermediate channel data |
| 505 | Sub-step of applying output LUTs to intermediate channel data to produce output/processed image |
| 601 | Model is image-dependent flare model |
| 602 | Model is image-dependent non-linearity model |
| 603 | Model is image-dependent preferred reproduction model |
| 604 | Model is output-dependent preferred reproduction model |
| 200' | Step of providing original image |
| 300' | Step of constructing scaled image |
| 301' | Sub-step of spatially blurring original image |
| 302' | Sub-step of sub-sampling blurred image |
| 400' | Step of deriving image statistics from scaled image |
| 500' | Step of processing original image in accordance with statistics derived from scaled image |
| 501' | Sub-step of determining image-dependent linearization information |
| 502' | Sub-step of determining image-dependent reproduction characteristics from image statistics |
| 700 | Step of determining scene luminance statistics of original |
| 800 | Step of determining output media density ranges |
| 900 | Step of determining preferred reproduction curves |
| 901 | Sub-step of construction preferred reproduction model |
| 902 | Sub-step of taking into account conditions under which image is viewed |
| 1000 | Step of applying preferred reproduction curves to original |
| 1100 | Step of determining whether original data is sRGB |
| 1200 | Step of transforming original data to RGB (if necessary) |
| 1300 | Step of determining tone reproduction transformation |

-continued

List of Reference Numerals and Corresponding Elements of Exemplary Embodiments

| | |
|---|---|
| 1310 | Sub-step of determining relationship between luminance channels of original and scaled images |
| 1400 | Step of applying tone reproduction transformation to each RGB channel |
| 1500 | Step of specifying nature of original reproduction |
| 1600 | Step of obtaining image data related to original reproduction |
| 1700 | Step of transforming image data to appropriate color space |
| 1800 | Step of processing data for desired reproduction |
| 1810 | Desired reproduction uses same output media with different reproduction |
| 1820 | Desired reproduction uses different output media with same reproduction |
| 1830 | Desired reproduction uses different output media with different reproduction |
| 1900 | Step of providing original image |
| 2000 | Step of constructing reproduction model |
| 2100 | Step of processing original image in accordance with preferred reproduction model |
| 2200 | Step of allowing adjustment of processed image via adjustment of parameter of preferred reproduction model |
| 2210 | Parameter is channel multiplier |
| 2220 | Parameter is scale factor |
| 2230 | Parameter is model value for scene key estimate of reproduction model |
| 2240 | Parameter is model value for scene luminance/output density range relation estimate |
| 2250 | Paramter is scene Zone 1 output density |
| 2260 | Paramter is scene Zone 5 output density |
| 2270 | Paramter is scene Zone 9 output density |

I claim:

1. A method of pictorial digital image processing comprising the steps of:
constructing a scaled version of original image data;
processing the scaled version of the original image data to collect luminance statistics;
obtaining visual density capabilities of an output device to be used for producing a processed image;
determining a tone reproduction curve from the luminance statistics and a visual density range; and
transforming the original image data into color space values, using the tone reproduction curve, for producing the processed image with the output device.

2. The method of claim 1 in which the step of processing the scaled version of the original image data includes collecting exposure statistics from the scaled version of the original image data.

3. The method of claim 2 in which the step of determining the tone reproduction curve includes adjusting the tone reproduction curve to compensate for variations in reflectance determined from the exposure statistics.

4. The method of claim 2 in which the step of processing the scaled version of the original image data includes using the exposure statistics to determine the influence of flare and transforming the scaled version of the original image data into scaled image linear scene values using conversions that are modified to account for the influence of flare.

5. The method of claim 4 including the further step of storing the conversions that are modified to account for the influence of flare for use in said step of transforming the original image data.

6. The method of claim 5 in which the step of processing the scaled version of the original image data includes transforming the scaled image linear scene values into scaled image color space values using color transformations.

7. The method of claim 6 in which the step of processing the scaled version of the original image data includes collecting the luminance statistics from the scaled image color space values.

8. The method of claim 1 in which the step of transforming the original image data includes transforming the original image data into original image linear scene values using the stored conversions that were modified to account for flare.

9. The method of claim 8 in which the step of transforming the original image data includes transforming the original image linear scene values into original image intermediate color space values using the color transformations.

10. The method of claim 9 in which the step of transforming the original image data includes transforming the original image intermediate color space values into the color space values for the output device using the tone reproduction curve.

11. The method of claim 1 in which the step of transforming the original image data includes transforming the original image data into original image linear scene values, transforming the original image linear values into original image intermediate color space values using color transformations, and transforming the original image intermediate color space values into the color space values for the output device using the tone reproduction curve.

12. The method of claim 11 in which the tone reproduction curve takes the form of a lookup table.

13. The method of claim 11 in which the tone reproduction curve is applied to multiple color channels.

14. The method of claim 13 in which the color channels are red, green, and blue channels.

15. The method of claim 11 including a further step of obtaining conversion functions for the output device and the step of transforming the original image data includes incorporating both the tone reproduction curve and the conversion functions for the output device in a common lookup table.

16. The method of claim 1 in which the step of determining the tone reproduction curve provides for changing a shape of the curve through a continuum of values.

17. The method of claim 1 in which the step of determining the tone reproduction curve includes determining both a scene pictorial dynamic range from the luminance statistics and an output pictorial dynamic range from the visual density capabilities of the output device and relating the two dynamic ranges in the tone reproduction curve.

18. The method of claim 17 in which the step of obtaining the visual density capabilities of the output device includes assuming capabilities of the output device.

19. The method of claim 17 in which the step of determining the tone reproduction curve includes applying an S-shaped flex adjustment to the tone reproduction curve based on a comparison between the scene pictorial dynamic range and the output pictorial dynamic range.

20. The method of claim 17 in which the step of processing the scaled version of the original image data includes collecting exposure statistics and the step of determining the tone reproduction curve includes applying a shift adjustment to the tone reproduction curve based on the exposure statistics from the scaled version of the original image data.

21. The method of claim 17 including a further step of obtaining data for intended viewing conditions of the processed image and the step of determining the tone reproduction curve includes adjustments for the intended viewing conditions of the processed image.

22. The method of claim 21 in which the step of determining the tone reproduction curve includes adjusting the output pictorial dynamic range for the intended viewing conditions of the processed image.

23. The method of claim 1 in which the step of determining the tone reproduction curve includes incorporating operator input.

24. The method of claim 23 in which the operator input includes adjustments to the tone reproduction curve relating to contrast and brightness.

25. The method of claim 23 in which the operator input includes adjustments to the tone reproduction curve relating to viewing conditions.

26. The method of claim 1 in which the step of constructing the scaled version of original image data includes spatially blurring the original image data and sub-sampling blurred data of the original image to produce the scaled version of the original image data.

27. The method of claim 1 in which the step of determining the tone reproduction curve includes an adjustment based on an estimate of scene key obtained from the luminance statistics.

* * * * *